US012793511B2

(12) United States Patent
Smith et al.

(10) Patent No.: US 12,793,511 B2
(45) Date of Patent: Nov. 10, 2026

(54) GAMING SYSTEM AND METHOD WITH DEDICATED SYMBOL REEL FOR MODIFYING GAMING OPERATIONS

(71) Applicant: Aristocrat Technologies, Inc., Las Vegas, NV (US)

(72) Inventors: Zachary Smith, Austin, TX (US); Scott Hopkins, Austin, TX (US); Rogelio Decasa, Jr., Renton, WA (US); Nathan Warms, Austin, TX (US); Steven Richardson, Round Rock, TX (US); Kelly Lockheed, Elkridge, MD (US); Ginette McKay, Austin, TX (US)

(73) Assignee: Aristocrat Technologies, Inc., Las Vegas, NV (US)

( * ) Notice: Subject to any disclaimer, the term of this patent is extended or adjusted under 35 U.S.C. 154(b) by 167 days.

(21) Appl. No.: 18/593,457

(22) Filed: Mar. 1, 2024

(65) Prior Publication Data

US 2025/0157303 A1 May 15, 2025

Related U.S. Application Data

(60) Provisional application No. 63/598,720, filed on Nov. 14, 2023.

(51) Int. Cl.
*G07F 17/32* (2006.01)
*G07F 17/34* (2006.01)

(52) U.S. Cl.
CPC ...... *G07F 17/3267* (2013.01); *G07F 17/3213* (2013.01); *G07F 17/34* (2013.01)

(58) Field of Classification Search
None
See application file for complete search history.

(56) References Cited

U.S. PATENT DOCUMENTS

| | | | |
|---|---|---|---|
| 9,600,979 B2 | 3/2017 | Hornik | |
| 10,614,655 B2 | 4/2020 | Kania | |
| 11,587,394 B2 | 2/2023 | Fan | |
| 2016/0093148 A1 | 3/2016 | Hawkins | |
| 2016/0314661 A1* | 10/2016 | Vann | G07F 17/3288 |
| 2019/0295376 A1 | 9/2019 | Ludwick | |
| 2022/0262206 A1* | 8/2022 | Djemal | G07F 17/3258 |

* cited by examiner

*Primary Examiner* — Lawrence S Galka

(74) *Attorney, Agent, or Firm* — Armstrong Teasdale LLP

(57) ABSTRACT

A system and associated processes that includes a gaming computing device is provided. The gaming computing device is programmed to cause display of a plurality of reels wherein each reel includes a plurality of symbols for display therein including a plurality of value symbols, and to cause display of a mega reel that includes at least one mega symbol. The at least one mega symbol is associated with an operation applied to the symbols displayed on the reels, and an output from a random number generator and a lookup within a lookup table may be used to determine a mega symbol to display on the mega reel and to execute the operation associated with the mega symbol to affect the symbols displayed on the reels and an award provided therefrom.

18 Claims, 15 Drawing Sheets

GAMING SYSTEM AND METHOD WITH DEDICATED SYMBOL REEL FOR MODIFYING GAMING OPERATIONS

CROSS-REFERENCE TO RELATED APPLICATIONS

This application claims the benefit of priority to U.S. Provisional Patent Application No. 63/598,720, filed Nov. 14, 2023, the content of which is incorporated herein by reference in its entirety.

TECHNICAL FIELD

The field of disclosure relates generally to electronic gaming, and more specifically, to an electronic gaming device and method that includes a dedicated mega symbol reel for modifying gaming operations, specifically modifying a hold and spin game operation.

BACKGROUND

Electronic gaming machines ("EGMs") and other gaming devices provide a variety of wagering games such as slot games, video poker games, video blackjack games, roulette games, video bingo games, keno games and other types of games that are frequently offered at casinos and other locations. Play on EGMs typically involves a player establishing a credit balance by inputting money, or another form of monetary credit, and placing a monetary wager (from the credit balance) on one or more outcomes of an instance (or single play) of a primary or base game. In some cases, a player may qualify for a special mode of the base game, a secondary game, or a bonus round of the base game by attaining a certain winning combination or triggering event in, or related to, the base game, or after the player is randomly awarded the special mode, secondary game, or bonus round. In the special mode, secondary game, or bonus round, the player is given an opportunity to win extra game credits, game tokens or other forms of payout. In the case of "game credits" that are awarded during play, the game credits are typically added to a credit meter total on the EGM and can be provided to the player upon completion of a gaming session or when the player wants to "cash out."

"Slot" type games are often displayed to the player in the form of various symbols arrayed in a row-by-column grid or matrix. Specific matching combinations of symbols along predetermined paths (or paylines) through the matrix indicate the outcome of the game. The display typically highlights winning combinations/outcomes for ready identification by the player. Matching combinations and their corresponding awards are usually shown in a "pay-table" which is available to the player for reference. Often, the player may vary his/her credit input to include differing numbers of paylines and/or the amount bet on each line. By varying the wager, the player may sometimes alter the frequency or number of winning combinations, frequency or number of secondary games, and/or the amount awarded.

Typical games use a random number generator (RNG) to randomly determine the outcome of each game. The game is designed to return a certain percentage of the amount wagered back to the player (RTP=return to player) over the course of many plays or instances of the game. The RTP and randomness of the RNG are critical to ensuring the fairness of the games and are therefore highly regulated. Upon initiation of play, the RNG randomly determines a game outcome and symbols are then selected which correspond to that outcome. Notably, some games may include an element of skill on the part of the player and are therefore not entirely random. In one aspect, an electronic gaming device includes a user interface including a display, a memory storing gaming instructions, and a game controller including at least one processor in communication with the memory and the user interface, where the game controller is configured to execute the gaming instructions to receive an initial credit input, initiate a game instance in response to receiving the initial credit input, and in response to a completion of the game instance, trigger a bonus game operation that extends the game instance. Associated processes may be responsive to or otherwise based off of an initial credit input at a time without requiring the player to re-wager. As such, the bonus operation may be automatically triggered at a point at which play would otherwise end without another credit input or other action by the player to continue the game session. An example embodiment of the subject matter disclosed will now be described with reference to the accompanying drawings.

BRIEF SUMMARY

In one aspect, an electronic gaming device including at least one memory with instructions stored thereon; and at least one processor in communication with the at least one memory is provided. The instructions, when executed by the at least one processor, cause the at least one processor to cause a display of a plurality of reels wherein each reel includes a plurality of symbols for display therein including a plurality of value symbols, cause a display of a mega reel that includes at least one mega symbol wherein the at least one mega symbol is associated with an operation applied to the symbols displayed on the reels, using an output from a random number generator and a lookup within a lookup table to determine a mega symbol to display on the mega reel, and execute the operation associated with the mega symbol to affect the symbols displayed on the reels and an award provided therefrom.

In another aspect, a computer-implemented method of providing a game for display on a computing device is provided. The method includes causing a display of a plurality of reels wherein each reel includes a plurality of symbols for display therein including a plurality of value symbols, causing a display of a mega reel that includes at least one mega symbol wherein the at least one mega symbol is associated with an operation applied to the symbols displayed on the reels, using an output from a random number generator and a lookup within a lookup table to determine a mega symbol to display on the mega reel, and executing the operation associated with the mega symbol to affect the symbols displayed on the reels and an award provided therefrom.

In another aspect, a non-transitory computer-readable storage medium is provided. The computer-executable instructions that when executed by at least one processor, cause the at least one processor to cause a display of a plurality of reels wherein each reel includes a plurality of symbols for display therein including a plurality of value symbols, cause a display of a mega reel that includes at least one mega symbol wherein the at least one mega symbol is associated with an operation applied to the symbols displayed on the reels, using an output from a random number generator and a lookup within a lookup table to determine a mega symbol to display on the mega reel, and execute the operation associated with the mega symbol to affect the symbols displayed on the reels and an award provided therefrom.

DETAILED DESCRIPTION

Figure 1:
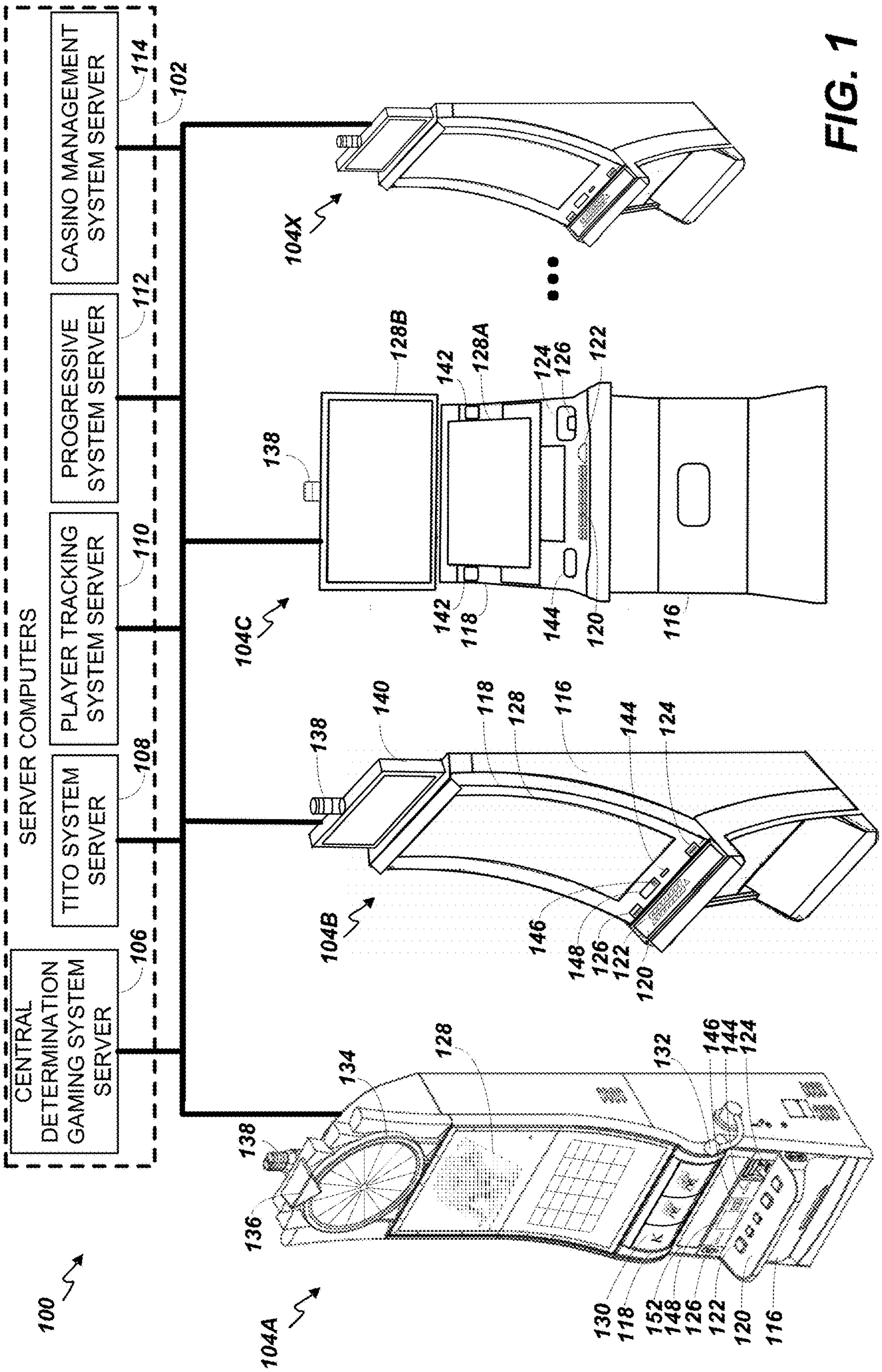
FIG. 1 is an exemplary diagram showing several gaming devices networked with various gaming related servers.

The present application is directed to electronic gaming, and more specifically, to electronic gaming operations that include a gaming device that is configured to provide within a feature or bonus game a dedicated mega reel that includes a plurality of different mega symbols having different operations associated therewith that may be displayed during game play and further includes a plurality of blank symbols that may have little to no impact on the game operations when displayed during game play. The mega reel may randomly spin beside an array of hold and spin game reels (feature or bonus game reels) to enhance potential game payouts. For instance, when the mega reel lands on a mega symbol, the potential payout of the hold and spin game may be modified according to an underlying function, or operation, of the mega symbol. Conversely, a miss on the mega reel may result in the unaffected operation of the hold and spin game. According to a particular embodiment, the game operations described herein may be executed on gaming devices in an online or social environment, while other implementations may be performed in a casino environment, such as on a Class III gaming device or a Class II gaming device.

In one implementation, the size of the mega symbols and the mega reel may be larger than that of a conventional symbol and associated reel. For example, in the present embodiment, the mega reel is formed from a combination of several (e.g., 2 columns and 3 rows) base game symbol positions. For instance, two base game reels may appear to merge during game operation, seemingly transitioning into a single mega reel that is twice the width of one of the former, merged base game reels. Put another way, the mega reel may occupy a space equivalent to that formerly occupied by the two merged reels, which includes about 6 base game symbol positions. Initializing of the mega reel and associated meg symbol(s) may be presented within the hold and spin interface, while leaving multiple hold and spin reels intact.

In one embodiment of the mega reel, the mega reel may include a single reel that spins independently and either displays a mega symbol or a blank symbol. As explained herein, lookup tables stored in memory and associated with the mega symbol reel may be weighted based upon on how many COR symbols are currently present and displayed within the hold and spin reels area. For example, certain types of mega symbols may be less likely to be displayed when an increasing number of hold COR symbols are displayed on the feature game reels. Each mega symbol on the randomly spinning mega reel may be associated with an operation that may modify awards of the hold and spin operation. As such, an embodiment of the system may include an output from an RNG for the COR symbols when determining from the lookup tables whether to display another COR symbol and/or another output from the RNG for the mega symbols when determining which mega symbol to display or if a blank symbol is to be displayed.

In one specific example embodiment of a mega symbol being displayed on the mega reel in the mega symbol position, the mega reel may land on a blast mega symbol. An operation associated with the blast mega symbol may initiate operations similar to a spot prize and instantly payout all of the COR symbols currently present on the hold and spin reels. As such, a player may be awarded multiple times the COR values, namely, once up front when the blast mega symbol is displayed, and then, again, at the end of the feature game when the COR values displayed are awarded.

Another operation associated with a different mega symbol of the mega reel may include an add operation. The mega reel displaying the add mega symbol may result in the random distribution of one or more COR symbols on the hold and spin reel positions in which there currently is not a COR symbol displayed, or in another case where the designated symbol position is already populated with a COR symbol, then the operation may upgrade the award value of the currently displayed COR symbol with an additional value designated by the lookup tables. For instance, a value of an existing COR symbol may be upgraded from 1.5 million credits to 3.5 million credits. To this end, the present gaming system may include more than one lookup table that is used to determine the value to be added to the feature reels. For example, in the case where a new COR symbol is to be displayed on the feature reels, the gaming device may use an output from the RNG and a lookup within a first lookup table (e.g., add new COR symbol table) to then determine how much value is added to the feature reels through the display of the new COR symbol. However, in the case where a COR symbol already is displayed in a selected position on the feature reels, the gaming device may use an output from the RNG and a lookup within a second lookup table (e.g., add value to existing COR symbol table) to then determine how much value is to be added to the already displayed COR symbol.

Another example of an operation associated with a different mega symbol of the mega reel may include an extra spin operation. The mega reel landing on the extra spin mega symbol may result in the game adding one or more extra spins that may be played after the initial spins of the feature game are exhausted. For example, the extra spin mega symbol of an embodiment may precipitate up to three spins to play at the end of the feature game. As described herein, an additional meter (e.g., positioned next to a regular hold and spin counter) may show the amount of available extra spins. The extra spins may afford the player a chance to land additional COR symbols and mega symbols.

Another example of an operation associated with a different mega symbol of the mega reel may include a grow operation. The mega reel landing on the grow mega symbol may result in the game adding one or more reels to the array of hold and spin reels. For example, a new reel may be added to a rightmost reel of the array. The additional reel may provide an increased chance to land additional COR symbols and mega symbols.

Embodiments of the present disclosure represent a technical improvement in the art of electronic gaming machines, systems, and operating for such electronic gaming machines or systems. At least some of the technical improvements embodied by the present disclosure include making it easier for the gaming machine to perform by conserving data storage and computation resources when performing these new gaming operations, as well as easier for the player to follow by displaying information in a new way that is more easily understandable by a player including on a display device with limited display real estate. For example, a display configuration and underlying program code include a single, separate reel that provides enhancement awards, namely the mega symbol reel, that get applied to symbols displayed on a set of other reels, namely the feature game reels. In other known games, the distribution of enhanced awards would traditionally be included within each of the symbol positions on a game play area as opposed to being included on its own separate reel that then gets applied to the other reels. The singularity of the mega symbol reel provides tighter control and management of awards. It also conserves on computation resources and memory by allowing the processor(s) to store a limited amount of data associated with the symbols to be displayed within the mega reel and the limited computations needed for determining which symbols to display on the mega reel as opposed to the more conventional approach which requires a determination for each symbol position on a game play matrix regarding whether an enhancement is to be added to that symbol. Again, in the present system, this operation is only performed within the context of the mega reel and not each and every other symbol position. In additional benefit includes better control of RTP to the player.

By way of further example, an implementation of the present system may perform fewer computations associated with different positions and combination of cash-on-reel (COR) symbols within the reel. An embodiment of the system may additionally enable more winning combinations of COR symbol distributions than existing games. For instance, the mega symbol of the dedicated mega symbol reel may enable different winning variations (e.g., payouts) and combinations of the COR symbols on the hold and spin reels, which provides more variability to the game. COR symbol patterns that may historically have not produced an award may now payout for a player. In another example, different awards may increase variability by using different pay tables depending on whether a new COR symbol is awarded, or the value of an already present (e.g., held) COR symbol is increased. The readily perceived size and positioning of the mega symbol and the dedicated mega reel may additionally allow the player to have a better understanding of what is going on during the game.

FIG. 1 illustrates several different models of EGMs which may be networked to various gaming related servers. Shown is a system 100 in a gaming environment including one or more server computers 102 (e.g., slot servers of a casino) that are in communication, via a communications network, with one or more gaming devices 104A-104X (EGMs, slots, video poker, bingo machines, etc.) that can implement one or more aspects of the present disclosure. The gaming devices 104A-104X may alternatively be portable and/or remote gaming devices such as, but not limited to, a smart phone, a tablet, a laptop, or a game console. Gaming devices 104A-104X utilize specialized software and/or hardware to form non-generic, particular machines or apparatuses that comply with regulatory requirements regarding devices used for wagering or games of chance that provide monetary awards.

Communication between the gaming devices 104A-104X and the server computers 102, and among the gaming devices 104A-104X, may be direct or indirect using one or more communication protocols. As an example, gaming devices 104A-104X and the server computers 102 can communicate over one or more communication networks, such as over the Internet through a website maintained by a computer on a remote server or over an online data network including commercial online service providers, Internet service providers, private networks (e.g., local area networks and enterprise networks), and the like (e.g., wide area networks). The communication networks could allow gaming devices 104A-104X to communicate with one another and/or the server computers 102 using a variety of communication-based technologies, such as radio frequency (RF) (e.g., wireless fidelity (WiFi®) and Bluetooth®), cable TV, satellite links and the like.

In some implementation, server computers 102 may not be necessary and/or preferred. For example, in one or more implementations, a stand-alone gaming device such as gaming device 104A, gaming device 104B or any of the other gaming devices 104C-104X can implement one or more aspects of the present disclosure. However, it is typical to find multiple EGMs connected to networks implemented with one or more of the different server computers 102 described herein.

The server computers 102 may include a central determination gaming system server (not separately shown), a ticket-in-ticket-out (TITO) system server 108, a player tracking system server 110, a progressive system server 112, and/or a casino management system server 114. Gaming devices 104A-104X may include features to enable operation of any or all servers for use by the player and/or operator (e.g., the casino, resort, gaming establishment, tavern, pub, etc.). For example, game outcomes may be generated on a central determination gaming system server and then transmitted over the network to any of a group of remote terminals or remote gaming devices 104A-104X that utilize the game outcomes and display the results to the players.

Gaming device 104A is often of a cabinet construction which may be aligned in rows or banks of similar devices for placement and operation on a casino floor. The gaming device 104A often includes a main or service door 154 which provides access to the interior of the cabinet. Gaming device 104A typically includes a button area or button deck 120 accessible by a player that is configured with input switches or buttons 122, an access channel for a bill validator 124, and/or an access channel for a ticket-out printer 126.

In FIG. 1, gaming device 104A is shown as a Relm XL™ model gaming device manufactured by Aristocrat® Technologies, Inc. As shown, gaming device 104A is a reel machine having a gaming display area 118 including a number (typically 3 or 5) of mechanical reels 130 with various symbols displayed on them. The reels 130 are independently spun and stopped to show a set of symbols within the gaming display area 118 which may be used to determine an outcome to the game.

In many configurations, the gaming device 104A may have a main display 128 (e.g., video display monitor) mounted to, or above, the gaming display area 118. The main display 128 can be a high-resolution LCD, plasma, LED, or OLED panel which may be flat or curved as shown, a cathode ray tube, or other conventional electronically controlled video monitor.

In some embodiments, the bill validator 124 may also function as a "ticket-in" reader that allows the player to use a casino issued credit ticket (e.g., a voucher) to load credits onto the gaming device 104A (e.g., in a cashless ticket ("TITO") system). In such cashless embodiments, the gaming device 104A may also include a "ticket-out" printer 126 for outputting a credit ticket when a "cash out" button is pressed. Cashless TITO systems are used to generate and track unique bar-codes or other indicators printed on tickets to allow players to avoid the use of bills and coins by loading credits using a ticket reader and cashing out credits using a ticket-out printer 126 on the gaming device 104A. The gaming device 104A can have hardware meters for purposes including ensuring regulatory compliance and monitoring the player credit balance. In addition, there can be additional meters that record the total amount of money wagered on the gaming machine, total amount of money deposited, total amount of money withdrawn, total amount of winnings on gaming device 104A.

In some embodiments, a player tracking card reader 144, a transceiver for wireless communication with a player's smartphone, a keypad 146, and/or an illuminated display 148 for reading, receiving, entering, and/or displaying player tracking information is provided in gaming device 104A. In such embodiments, a game controller within the gaming device 104A can communicate with the player tracking system server 110 to send and receive player tracking information.

Gaming device 104A may also include a bonus topper wheel 134. When bonus play is triggered (e.g., by a player achieving a particular outcome or set of outcomes in the primary game), bonus topper wheel 134 is operative to spin and stop with indicator arrow 136 indicating the outcome of the bonus game. Bonus topper wheel 134 is typically used to play a bonus game, but it could also be incorporated into play of the base or primary game. Other bonus play may be presented on the display 148.

A candle 138 may be mounted on the top of gaming device 104A and may be activated by a player (e.g., using a switch or one of buttons 122) to indicate to operations staff that gaming device 104A has experienced a malfunction or the player requires service. The candle 138 is also often used to indicate a jackpot has been won and to alert staff that a hand payout of an award may be needed.

There may also be one or more information panels 152 which may be a back-lit, silkscreened glass panel with lettering to indicate general game information including, for example, a game denomination (e.g., $0.25 or $1), pay lines, pay tables, and/or various game related graphics. In some embodiments, the information panel(s) 152 may be implemented as an additional video display.

Gaming devices 104A have traditionally also included a handle 132 typically mounted to the side of main cabinet 116 which may be used to initiate game play.

Figure 2A:
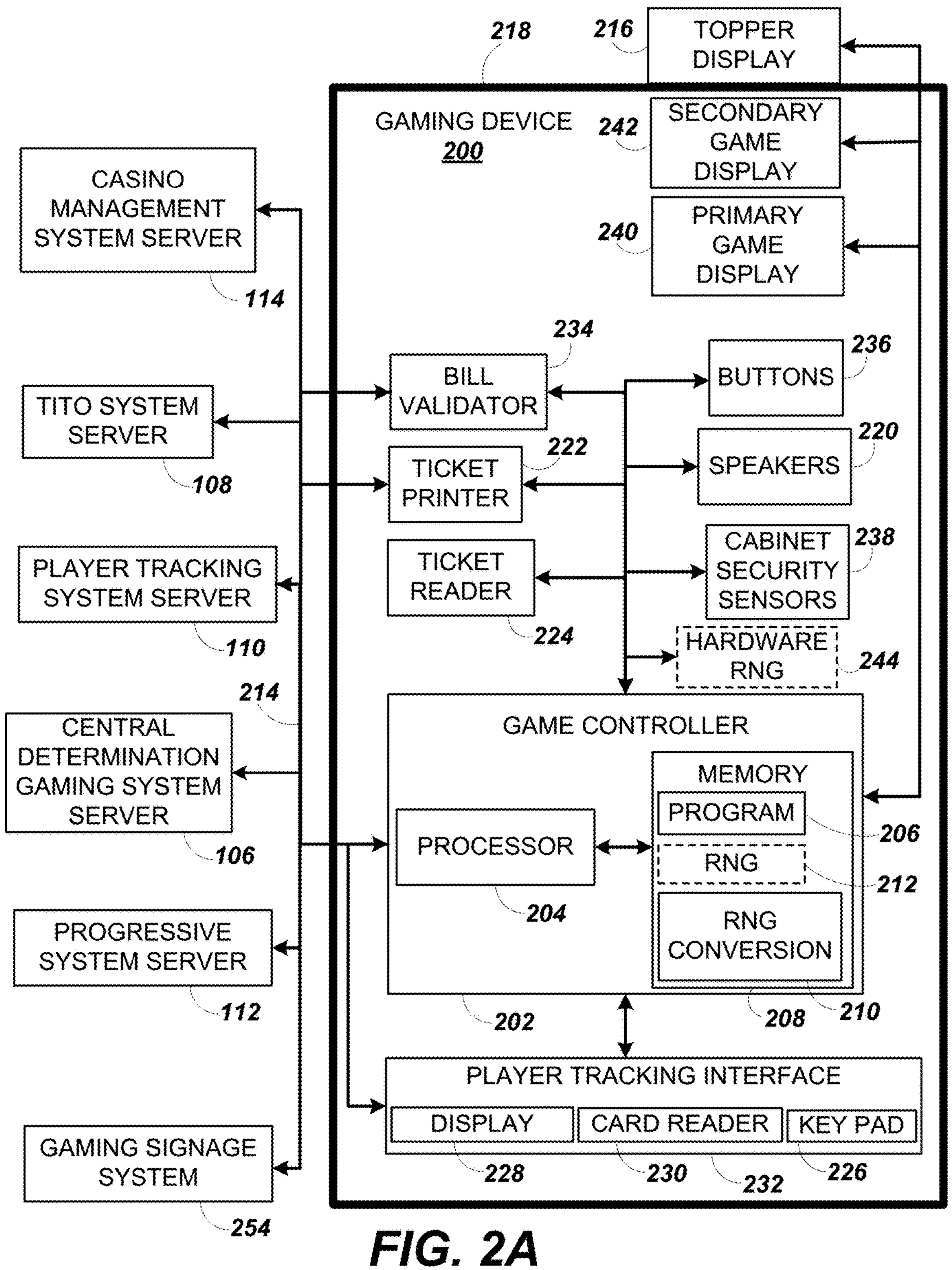
FIG. 2A is a block diagram showing various functional elements of an exemplary gaming device.

Many or all the above-described components can be controlled by circuitry (e.g., a gaming controller) housed inside the main cabinet 116 of the gaming device 104A, the details of which are shown in FIG. 2A.

An alternative example gaming device 104B illustrated in FIG. 1 is the Arc™ model gaming device manufactured by Aristocrat® Technologies, Inc. Note that where possible, reference numerals identifying similar features of the gaming device 104A embodiment are also identified in the gaming device 104B embodiment using the same reference numbers. Gaming device 104B does not include physical reels and instead shows game play functions on main display 128. An optional topper screen 140 may be used as a secondary game display for bonus play, to show game features or attraction activities while a game is not in play, or any other information or media desired by the game designer or operator. In some embodiments, topper screen 140 may also or alternatively be used to display progressive jackpot prizes available to a player during play of gaming device 104B.

Example gaming device 104B includes a main cabinet 116 including a main or service door 154 which opens to provide access to the interior of the gaming device 104B. The main or service door 154 is typically used by service personnel to refill the ticket-out printer 126 and collect bills and tickets inserted into the bill validator 124. The main or service door 154 may also be accessed to reset the machine, verify and/or upgrade the software, and for general maintenance operations.

Another example gaming device 104C shown is the Helix™ model gaming device manufactured by Aristocrat® Technologies, Inc. Gaming device 104C includes a main display 128A that is in a landscape orientation. Although not illustrated by the front view provided, the landscape display 128A may have a curvature radius from top to bottom, or alternatively from side to side. In some embodiments, display 128A is a flat panel display. Main display 128A is typically used for primary game play while secondary display 128B is typically used for bonus game play, to show game features or attraction activities while the game is not in play, or any other information or media desired by the game designer or operator. In some embodiments, example gaming device 104C may also include speakers 142 to output various audio such as game sound, background music, etc.

Many different types of games, including mechanical slot games, video slot games, video poker, video blackjack, video pachinko, keno, bingo, and lottery, may be provided with or implemented within the depicted gaming devices 104A-104C and other similar gaming devices. Each gaming device may also be operable to provide many different games. Games may be differentiated according to themes, sounds, graphics, type of game (e.g., slot game vs. card game vs. game with aspects of skill), denomination, number of paylines, maximum jackpot, progressive or non-progressive, bonus games, and may be deployed for operation in Class II or Class III, etc.

Any of the EGMs 104 may include a button deck 120. In the example embodiments described herein, the button deck 120 may include a button deck (not separately shown in FIG. 1) that includes one or more buttons 122 that may be configurable and that may be backlit by an LCD button deck display device within the button deck 120.

FIG. 2A is a block diagram depicting exemplary internal electronic components of a gaming device 200 connected to various external systems. All or parts of the gaming device 200 shown could be used to implement any one of the example gaming devices 104A-X depicted in FIG. 1. As shown in FIG. 2A, gaming device 200 includes a topper display 216 or another form of a top box (e.g., a topper wheel, a topper screen, etc.) that sits above cabinet 218. Cabinet 218 or topper display 216 may also house a number of other components which may be used to add features to a game being played on gaming device 200, including speakers 220, a ticket printer 222 which prints bar-coded tickets or other media or mechanisms for storing or indicating a player's credit value, a ticket reader 224 which reads bar-coded tickets or other media or mechanisms for storing or indicating a player's credit value, and a player tracking interface 232. Player tracking interface 232 may include a keypad 226 for entering information, a player tracking display 228 for displaying information (e.g., an illuminated or video display), a card reader 230 for receiving data and/or communicating information to and from media or a device such as a smart phone enabling player tracking. FIG. 2A also depicts utilizing a ticket printer 222 to print tickets for a TITO system server 108. Gaming device 200 may further include a bill validator 234, player-input buttons 236 for player input, cabinet security sensors 238 to detect unauthorized opening of the cabinet 218, a primary game display 240, and a secondary game display 242, each coupled to and operable under the control of game controller 202.

The games available for play on the gaming device 200 are controlled by a game controller 202 that includes a processor system that includes one or more processors. The processors may be collocated and/or distributed throughout the gaming device. Another processor including part of the processing system may be remotely located from the gaming device (e.g., at a remote server wirelessly connected to the gaming device). For example, processor 204 represents a general-purpose processor, a specialized processor intended to perform certain functional tasks, or a combination thereof. As an example, processor 204 can be a central processing unit (CPU) that has one or more multi-core processing units and memory mediums (e.g., cache memory) that function as buffers and/or temporary storage for data. Alternatively, processor 204 can be a specialized processor, such as an application specific integrated circuit (ASIC), graphics processing unit (GPU), field-programmable gate array (FPGA), digital signal processor (DSP), or another type of hardware accelerator. In another example, processor 204 is a system on chip (SoC) that combines and integrates one or more general-purpose processors and/or one or more specialized processors. Although FIG. 2A illustrates that game controller 202 includes a single processor 204, game controller 202 is not limited to this representation and instead can include multiple processors 204 (e.g., two or more processors).

FIG. 2A illustrates that processor 204 is operatively coupled to memory 208. Memory 208 is defined herein as including volatile and nonvolatile memory and other types of non-transitory data storage components. Volatile memory is memory that do not retain data values upon loss of power. Nonvolatile memory is memory that do retain data upon a loss of power. Examples of memory 208 include random access memory (RAM), read-only memory (ROM), hard disk drives, solid-state drives, universal serial bus (USB) flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, examples of RAM include static random access memory (SRAM), dynamic random access memory (DRAM), magnetic random access memory (MRAM), and other such devices. Examples of ROM include a programmable read-only memory (PROM), an erasable programmable read-only memory (EPROM), an electrically erasable programmable read-only memory (EEPROM), or other like memory device. Even though FIG. 2A illustrates that game controller 202 includes a single memory 208, game controller 202 could include multiple memories 208 for storing program instructions and/or data.

Memory 208 can store one or more game programs 206 that provide program instructions and/or data for carrying out various implementations (e.g., game mechanics) described herein. Stated another way, game program 206 represents an executable program stored in any portion or component of memory 208. In one or more implementations, game program 206 is embodied in the form of source code that includes human-readable statements written in a programming language or machine code that contains numerical instructions recognizable by a suitable execution system, such as a processor 204 in a game controller or other system. Examples of executable programs include: (1) a compiled program that can be translated into machine code in a format that can be loaded into a random access portion of memory 208 and run by processor 204; (2) source code that may be expressed in proper format such as object code that is capable of being loaded into a random access portion of memory 208 and executed by processor 204; and (3) source code that may be interpreted by another executable program to generate instructions in a random access portion of memory 208 to be executed by processor 204.

Alternatively, game programs 206 can be set up to generate one or more game instances based on instructions and/or data that gaming device 200 exchanges with one or more remote gaming devices, such as a central determination gaming system server 106 (not shown in FIG. 2A but shown in FIG. 1). For purpose of this disclosure, the term "game instance" refers to a play or a round of a game that gaming device 200 presents (e.g., via a user interface (UI))

to a player. The game instance is communicated to gaming device 200 via the network 214 and then displayed on gaming device 200. For example, gaming device 200 may execute game program 206 as video streaming software that allows the game to be displayed on gaming device 200. When a game is stored on gaming device 200, it may be loaded from memory 208 (e.g., from a read only memory (ROM)) or from the central determination gaming system server 106 to memory 208.

Gaming devices, such as gaming device 200, are highly regulated to ensure fairness and, in many cases, gaming device 200 is operable to award monetary awards (e.g., typically dispensed in the form of a redeemable voucher). Therefore, to satisfy security and regulatory requirements in a gaming environment, hardware and software architectures are implemented in gaming devices 200 that differ significantly from those of general-purpose computers. Adapting general purpose computers to function as gaming devices 200 is not simple or straightforward because of: (1) the regulatory requirements for gaming devices 200, (2) the harsh environment in which gaming devices 200 operate, (3) security requirements, (4) fault tolerance requirements, and (5) the requirement for additional special purpose componentry enabling functionality of an EGM. These differences require substantial engineering effort with respect to game design implementation, game mechanics, hardware components, and software.

One regulatory requirement for games running on gaming device 200 generally involves complying with a certain level of randomness. Typically, gaming jurisdictions mandate that gaming devices 200 satisfy a minimum level of randomness without specifying how a gaming device 200 should achieve this level of randomness. To comply, FIG. 2A illustrates that gaming device 200 could include an RNG 212 that utilizes hardware and/or software to generate RNG outcomes that lack any pattern. The RNG operations are often specialized and non-generic in order to comply with regulatory and gaming requirements. For example, in a slot game, game program 206 can initiate multiple RNG calls to RNG 212 to generate RNG outcomes, where each RNG call and RNG outcome corresponds to an outcome for a reel. In another example, gaming device 200 can be a Class II gaming device where RNG 212 generates RNG outcomes for creating bingo cards. In one or more implementations, RNG 212 could be one of a set of RNGs operating on gaming device 200. More generally, an output of the RNG 212 can be the basis on which game outcomes are determined by the game controller 202. Game developers could vary the degree of true randomness for each RNG (e.g., pseudorandom) and utilize specific RNGs depending on game requirements. The output of the RNG 212 can include a random number or pseudorandom number (either is generally referred to as a "random number").

In FIG. 2A, RNG 212 and hardware RNG 244 are shown in dashed lines to illustrate that RNG 212, hardware RNG 244, or both can be included in gaming device 200. In one implementation, instead of including RNG 212, gaming device 200 could include a hardware RNG 244 that generates RNG outcomes. Analogous to RNG 212, hardware RNG 244 performs specialized and non-generic operations in order to comply with regulatory and gaming requirements. For example, because of regulation requirements, hardware RNG 244 could be a random number generator that securely produces random numbers for cryptography use. The gaming device 200 then uses the secure random numbers to generate game outcomes for one or more game features. In another implementation, the gaming device 200 could include both hardware RNG 244 and RNG 212. RNG 212 may utilize the RNG outcomes from hardware RNG 244 as one of many sources of entropy for generating secure random numbers for the game features.

Another regulatory requirement for running games on gaming device 200 includes ensuring a certain level of RTP. Similar to the randomness requirement discussed above, numerous gaming jurisdictions also mandate that gaming device 200 provides a minimum level of RTP (e.g., RTP of at least 75%). A game can use one or more lookup tables (also called weighted tables) as part of a technical solution that satisfies regulatory requirements for randomness and RTP. In particular, a lookup table can integrate game features (e.g., trigger events for special modes or bonus games; newly introduced game elements such as extra reels, new symbols, or new cards; stop positions for dynamic game elements such as spinning reels, spinning wheels, or shifting reels; or card selections from a deck) with random numbers generated by one or more RNGs, so as to achieve a given level of volatility for a target level of RTP. (In general, volatility refers to the frequency or probability of an event such as a special mode, payout, etc. For example, for a target level of RTP, a higher-volatility game may have a lower payout most of the time with an occasional bonus having a very high payout, while a lower-volatility game has a steadier payout with more frequent bonuses of smaller amounts.) Configuring a lookup table can involve engineering decisions with respect to how RNG outcomes are mapped to game outcomes for a given game feature, while still satisfying regulatory requirements for RTP. Configuring a lookup table can also involve engineering decisions about whether different game features are combined in a given entry of the lookup table or split between different entries (for the respective game features), while still satisfying regulatory requirements for RTP and allowing for varying levels of game volatility.

FIG. 2A illustrates that gaming device 200 includes an RNG conversion engine 210 that translates the RNG outcome from RNG 212 to a game outcome presented to a player. To meet a designated RTP, a game developer can set up the RNG conversion engine 210 to utilize one or more lookup tables to translate the RNG outcome to a symbol element, stop position on a reel strip layout, and/or randomly chosen aspect of a game feature. As an example, the lookup tables can regulate a prize payout amount for each RNG outcome and how often the gaming device 200 pays out the prize payout amounts. The RNG conversion engine 210 could utilize one lookup table to map the RNG outcome to a game outcome displayed to a player and a second lookup table as a pay table for determining the prize payout amount for each game outcome. The mapping between the RNG outcome to the game outcome controls the frequency in hitting certain prize payout amounts.

FIG. 2A also depicts that gaming device 200 is connected over network 214 to player tracking system server 110. Player tracking system server 110 may be, for example, an OASIS® system manufactured by Aristocrat® Technologies, Inc. Player tracking system server 110 is used to track play (e.g., amount wagered, games played, time of play and/or other quantitative or qualitative measures) for individual players so that an operator may reward players in a loyalty program. The player may use the player tracking interface 232 to access his/her account information, activate free play, and/or request various information. Player tracking or loyalty programs seek to reward players for their play and help build brand loyalty to the gaming establishment. The rewards typically correspond to the player's level of patronage (e.g., to the player's playing frequency and/or total amount of game plays at a given casino). Player tracking rewards may be complimentary and/or discounted meals, lodging, entertainment and/or additional play. Player tracking information may be combined with other information that is now readily obtainable by a casino management system.

When a player wishes to play the gaming device 200, he/she can insert cash or a ticket voucher through a coin acceptor (not shown) or bill validator 234 to establish a credit balance on the gaming device. The credit balance is used by the player to place credit inputs on instances of the game and to receive credit awards based on the outcome of winning instances. The credit balance is decreased by the amount of each credit input and increased upon a win. The player can add additional credits to the balance at any time. The player may also optionally insert a loyalty club card into the card reader 230. During the game, the player views with one or more UIs, the game outcome on one or more of the primary game display 240 and secondary game display 242. Other game and prize information may also be displayed.

For each game instance, a player may make selections, which may affect play of the game. For example, the player may vary the total amount wagered by selecting the amount bet per line and the number of lines played. In many games, the player is asked to initiate or select options during course of game play (such as spinning a wheel to begin a bonus round or select various items during a feature game). The player may make these selections by using the player-input buttons 236, the primary game display 240 (e.g., a touch screen), or by using some other device which enables a player to input information into the gaming device 200.

During certain game events, the gaming device 200 may display visual and auditory effects that can be perceived by the player. These effects add to the excitement of a game, which makes a player more likely to enjoy the playing experience. Auditory effects include various sounds that are projected by the speakers 220. Visual effects include flashing lights, strobing lights or other patterns displayed from lights on the gaming device 200 or from lights behind the information panel 152 (FIG. 1).

When the player is done, he/she cashes out the credit balance (typically by pressing a cash out button to receive a ticket from the ticket printer 222). The ticket may be "cashed-in" for money or inserted into another machine to establish a credit balance for play.

Additionally, or alternatively, gaming devices 104A-104X and 200 can include or be coupled to one or more wireless transmitters, receivers, and/or transceivers (not shown in FIGS. 1 and 2A) that communicate (e.g., Bluetooth® or other near-field communication technology) with one or more mobile devices to perform a variety of wireless operations in a casino environment. Examples of wireless operations in a casino environment include detecting the presence of mobile devices, performing credit, points, comps, or other marketing or hard currency transfers, establishing wagering sessions, and/or providing a personalized casino-based experience using a mobile application. In one implementation, to perform these wireless operations, a wireless transmitter or transceiver initiates a secure wireless connection between a gaming device 104A-104X and 200 and a mobile device. After establishing a secure wireless connection between the gaming device 104A-104X and 200 and the mobile device, the wireless transmitter or transceiver does not send and/or receive application data to and/or from the mobile device. Rather, the mobile device communicates with gaming devices 104A-104X and 200 using another wireless connection (e.g., WiFi® or cellular network).

In another implementation, a wireless transceiver establishes a secure connection to directly communicate with the mobile device. The mobile device and gaming device 104A-104X and 200 sends and receives data utilizing the wireless transceiver instead of utilizing an external network. For example, the mobile device would perform digital wallet transactions by directly communicating with the wireless transceiver. In one or more implementations, a wireless transmitter could broadcast data received by one or more mobile devices without establishing a pairing connection with the mobile devices.

Although FIGS. 1 and 2A illustrate specific implementations of a gaming device (e.g., gaming devices 104A-104X and 200), the disclosure is not limited to those implementations shown in FIGS. 1 and 2. For example, not all gaming devices suitable for implementing implementations of the present disclosure necessarily include top wheels, top boxes, information panels, cashless ticket systems, and/or player tracking systems. Further, some suitable gaming devices have only a single game display that includes only a mechanical set of reels and/or a video display, while others are designed for bar counters or tabletops and have displays that face upwards. Gaming devices 104A-104X and 200 may also include other processors that are not separately shown. Using FIG. 2A as an example, gaming device 200 could include display controllers (not shown in FIG. 2A) configured to receive video input signals or instructions to display images on game displays 240 and 242. Alternatively, such display controllers may be integrated into the game controller 202. The use and discussion of FIGS. 1 and 2 are examples to facilitate ease of description and explanation.

Figure 2B:
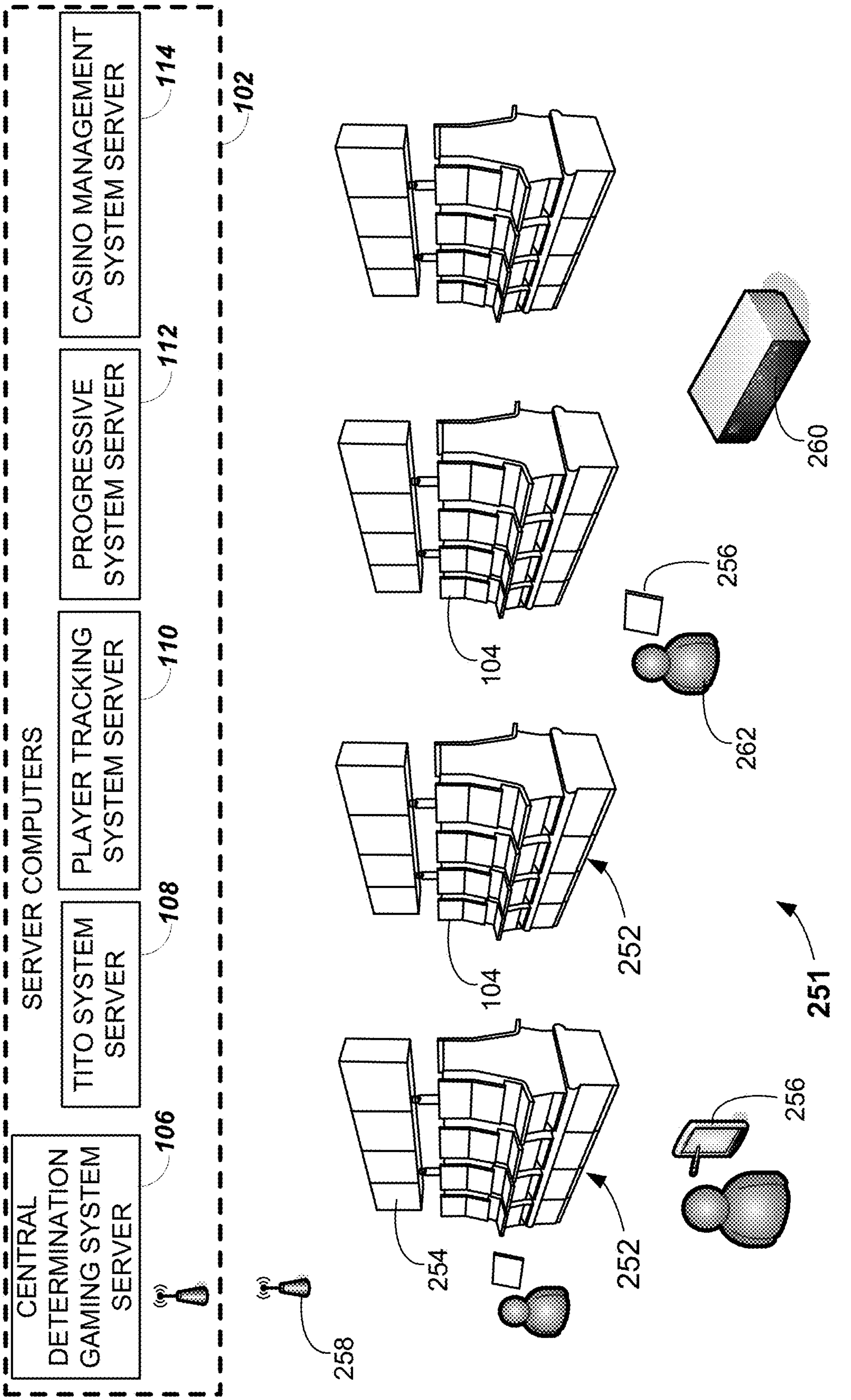
FIG. 2B depicts a casino gaming environment according to one example.

FIG. 2B depicts a casino gaming environment according to one example. In this example, the casino 251 includes banks 252 of EGMs 104. In this example, each bank 252 of EGMs 104 includes a corresponding gaming signage system 254 (also shown in FIG. 2A). According to this implementation, the casino 251 also includes mobile gaming devices 256, which are also configured to present wagering games in this example. The mobile gaming devices 256 may, for example, include tablet devices, cellular phones, smart phones and/or other handheld devices. In this example, the mobile gaming devices 256 are configured for communication with one or more other devices in the casino 251, including but not limited to one or more of the server computers 102, via wireless access points 258.

According to some examples, the mobile gaming devices 256 may be configured for stand-alone determination of game outcomes. However, in some alternative implementations the mobile gaming devices 256 may be configured to receive game outcomes from another device, such as the central determination gaming system server 106, one of the EGMs 104, etc.

Some mobile gaming devices 256 may be configured to accept monetary credits from a credit or debit card, via a wireless interface (e.g., via a wireless payment app), via tickets, via a patron casino account, etc. However, some mobile gaming devices 256 may not be configured to accept monetary credits via a credit or debit card. Some mobile gaming devices 256 may include a ticket reader and/or a ticket printer whereas some mobile gaming devices 256 may not, depending on the particular implementation.

In some implementations, the casino 251 may include one or more kiosks 260 that are configured to facilitate monetary transactions involving the mobile gaming devices 256, which may include cash out and/or cash in transactions. The kiosks 260 may be configured for wired and/or wireless communication with the mobile gaming devices 256. The kiosks 260 may be configured to accept monetary credits from casino patrons 262 and/or to dispense monetary credits to casino patrons 262 via cash, a credit or debit card, via a wireless interface (e.g., via a wireless payment app), via tickets, etc. According to some examples, the kiosks 260 may be configured to accept monetary credits from a casino patron and to provide a corresponding number of monetary credits to a mobile gaming device 256 for wagering purposes, e.g., via a wireless link such as a near-field communications link. In some such examples, when a casino patron 262 is ready to cash out, the casino patron 262 may select a cash out option provided by a mobile gaming device 256, which may include a real button or a virtual button (e.g., a button provided via a graphical user interface) in some instances. In some such examples, the mobile gaming device 256 may send a "cash out" signal to a kiosk 260 via a wireless link in response to receiving a "cash out" indication from a casino patron. The kiosk 260 may provide monetary credits to the casino patron 262 corresponding to the "cash out" signal, which may be in the form of cash, a credit ticket, a credit transmitted to a financial account corresponding to the casino patron, etc.

In some implementations, a cash-in process and/or a cash-out process may be facilitated by the TITO system server 108. For example, the TITO system server 108 may control, or at least authorize, ticket-in and ticket-out transactions that involve a mobile gaming device 256 and/or a kiosk 260.

Some mobile gaming devices 256 may be configured for receiving and/or transmitting player loyalty information. For example, some mobile gaming devices 256 may be configured for wireless communication with the player tracking system server 110. Some mobile gaming devices 256 may be configured for receiving and/or transmitting player loyalty information via wireless communication with a patron's player loyalty card, a patron's smartphone, etc.

According to some implementations, a mobile gaming device 256 may be configured to provide safeguards that prevent the mobile gaming device 256 from being used by an unauthorized person. For example, some mobile gaming devices 256 may include one or more biometric sensors and may be configured to receive input via the biometric sensor (s) to verify the identity of an authorized patron. Some mobile gaming devices 256 may be configured to function only within a predetermined or configurable area, such as a casino gaming area.

Figure 2C:
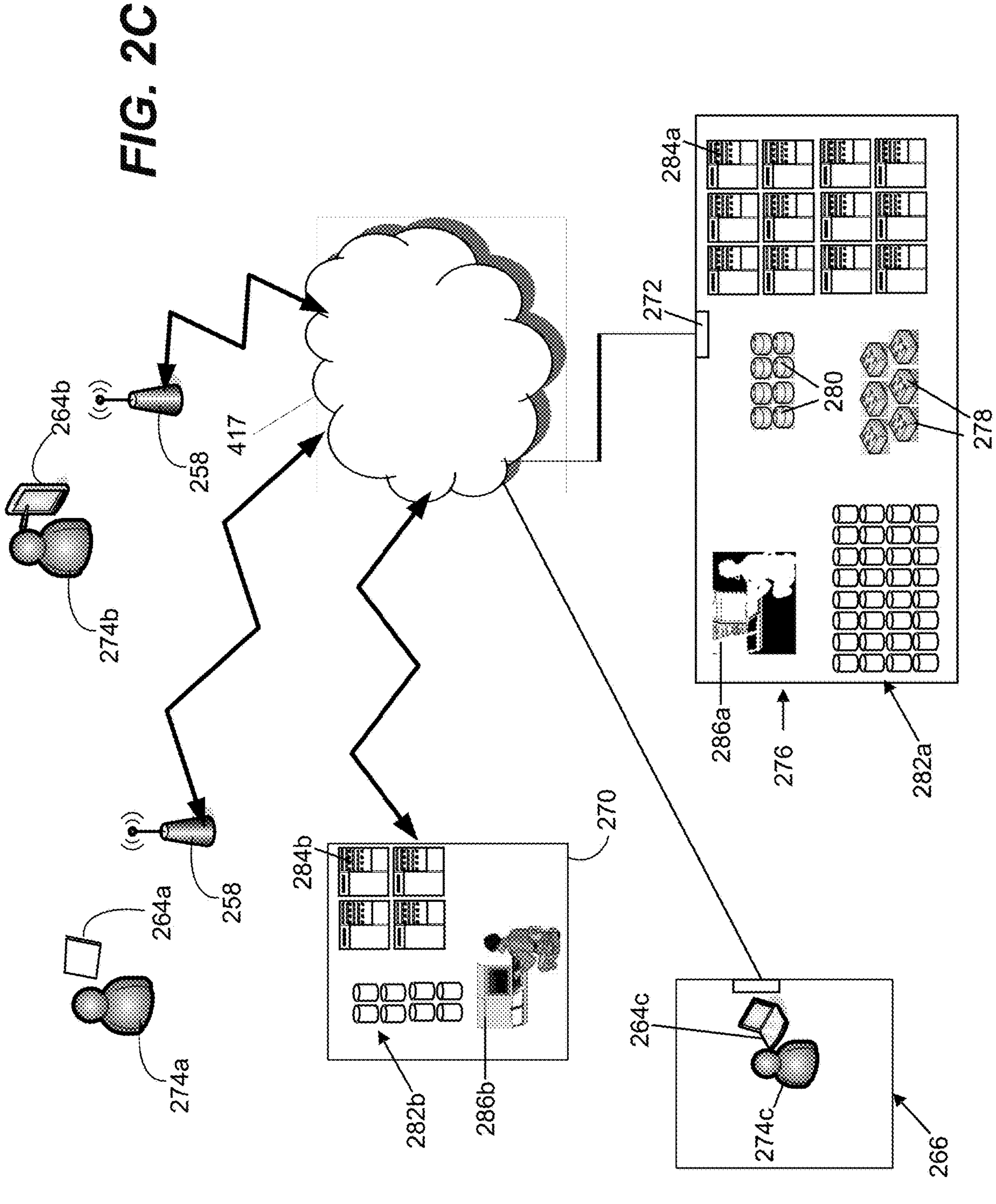
FIG. 2C is a diagram that shows examples of components of a system for providing online gaming according to some aspects of the present disclosure.

FIG. 2C is a diagram that shows examples of components of a system for providing online gaming according to some aspects of the present disclosure. As with other figures presented in this disclosure, the numbers, types and arrangements of gaming devices shown in FIG. 2C are merely shown by way of example. In this example, various gaming devices, including but not limited to end user devices (EUDs) 264*a*, 264*b* and 264*c* are capable of communication via one or more networks 417. The networks 417 may, for example, include one or more cellular telephone networks, the Internet, etc. In this example, the EUDs 264*a* and 264*b* are mobile devices: according to this example the EUD 264*a* is a tablet device and the EUD 264*b* is a smart phone. In this implementation, the EUD 264*c* is a laptop computer that is located within a residence 266 at the time depicted in FIG. 2C. Accordingly, in this example the hardware of EUDs is not specifically configured for online gaming, although each EUD is configured with software for online gaming. For example, each EUD may be configured with a web browser. Other implementations may include other types of EUD, some of which may be specifically configured for online gaming.

In this example, a gaming data center 276 includes various devices that are configured to provide online wagering games via the networks 417. The gaming data center 276 is capable of communication with the networks 417 via the gateway 272. In this example, switches 278 and routers 280 are configured to provide network connectivity for devices of the gaming data center 276, including storage devices 282*a*, servers 284*a* and one or more workstations 286*a*. The servers 284*a* may, for example, be configured to provide access to a library of games for online game play. In some examples, code for executing at least some of the games may initially be stored on one or more of the storage devices 282*a*. The code may be subsequently loaded onto a server 284*a* after selection by a player via an EUD and communication of that selection from the EUD via the networks 417. The server 284*a* onto which code for the selected game has been loaded may provide the game according to selections made by a player and indicated via the player's EUD. In other examples, code for executing at least some of the games may initially be stored on one or more of the servers 284*a*. Although only one gaming data center 276 is shown in FIG. 2C, some implementations may include multiple gaming data centers 276.

In this example, a financial institution data center 270 is also configured for communication via the networks 417. Here, the financial institution data center 270 includes servers 284*b*, storage devices 282*b*, and one or more workstations 286*b*. According to this example, the financial institution data center 270 is configured to maintain financial accounts, such as checking accounts, savings accounts, loan accounts, etc. In some implementations one or more of the authorized users 274*a*-274*c* may maintain at least one financial account with the financial institution that is serviced via the financial institution data center 270.

According to some implementations, the gaming data center 276 may be configured to provide online wagering games in which money may be won or lost. According to some such implementations, one or more of the servers 284*a* may be configured to monitor player credit balances, which may be expressed in game credits, in currency units, or in any other appropriate manner. In some implementations, the server(s) 284*a* may be configured to obtain financial credits from and/or provide financial credits to one or more financial institutions, according to a player's "cash in" selections, wagering game results and a player's "cash out" instructions. According to some such implementations, the server (s) 284*a* may be configured to electronically credit or debit the account of a player that is maintained by a financial institution, e.g., an account that is maintained via the financial institution data center 270. The server(s) 284*a* may, in some examples, be configured to maintain an audit record of such transactions.

In some alternative implementations, the gaming data center 276 may be configured to provide online wagering games for which credits may not be exchanged for cash or the equivalent. In some such examples, players may purchase game credits for online game play, but may not "cash out" for monetary credit after a gaming session. Moreover, although the financial institution data center 270 and the gaming data center 276 include their own servers and storage devices in this example, in some examples the financial institution data center 270 and/or the gaming data center 276 may use offsite "cloud-based" servers and/or storage devices. In some alternative examples, the financial institution data center 270 and/or the gaming data center 276 may rely entirely on cloud-based servers.

One or more types of devices in the gaming data center 276 (or elsewhere) may be capable of executing middleware, e.g., for data management and/or device communication. Authentication information, player tracking information, etc., including but not limited to information obtained by EUDs 264 and/or other information regarding authorized users of EUDs 264 (including but not limited to the authorized users 274*a*-274*c*), may be stored on storage devices 282 and/or servers 284. Other game-related information and/or software, such as information and/or software relating to leaderboards, players currently playing a game, game themes, game-related promotions, game competitions, etc., also may be stored on storage devices 282 and/or servers 284. In some implementations, some such game-related software may be available as "apps" and may be downloadable (e.g., from the gaming data center 276) by authorized users.

In some examples, authorized users and/or entities (such as representatives of gaming regulatory authorities) may obtain gaming-related information via the gaming data center 276. One or more other devices (such EUDs 264 or devices of the gaming data center 276) may act as intermediaries for such data feeds. Such devices may, for example, be capable of applying data filtering algorithms, executing data summary and/or analysis software, etc. In some implementations, data filtering, summary and/or analysis software may be available as "apps" and downloadable by authorized users.

Figure 3:
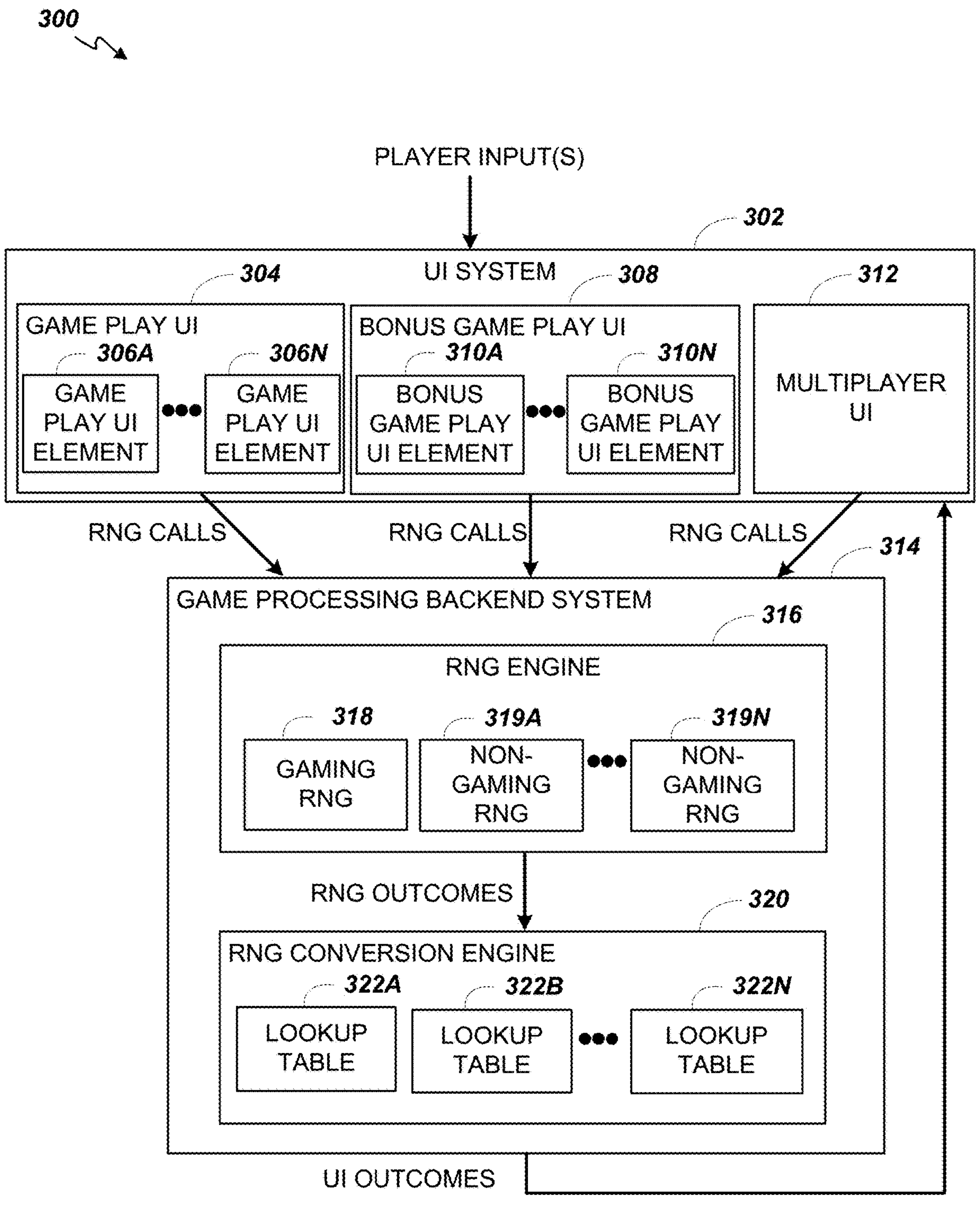
FIG. 3 illustrates, in block diagram form, an implementation of a game processing architecture algorithm that implements a game processing pipeline for the play of a game in accordance with various implementations described herein.

FIG. 3 illustrates, in block diagram form, an implementation of a game processing architecture 300 that implements a game processing pipeline for the play of a game in accordance with various implementations described herein. As shown in FIG. 3, the gaming processing pipeline starts with having a UI system 302 receive one or more player inputs for the game instance. Based on the player input(s), the UI system 302 generates and sends one or more RNG calls to a game processing backend system 314. Game processing backend system 314 then processes the RNG calls with RNG engine 316 to generate one or more RNG outcomes. The RNG outcomes are then sent to the RNG conversion engine 320 to generate one or more game outcomes for the UI system 302 to display to a player. The game processing architecture 300 can implement the game processing pipeline using a gaming device, such as gaming devices 104A-104X and 200 shown in FIGS. 1 and 2, respectively. Alternatively, portions of the gaming processing architecture 300 can implement the game processing pipeline using a gaming device and one or more remote gaming devices, such as central determination gaming system server 106 shown in FIG. 1.

The UI system 302 includes one or more UIs that a player can interact with. The UI system 302 could include one or more game play UIs 304, one or more bonus game play UIs 308, and one or more multiplayer UIs 312, where each UI type includes one or more mechanical UIs and/or graphical UIs (GUIs). In other words, game play UI 304, bonus game play UI 308, and the multiplayer UI 312 may utilize a variety of UI elements, such as mechanical UI elements (e.g., physical "spin" button or mechanical reels) and/or GUI elements (e.g., virtual reels shown on a video display or a virtual button deck) to receive player inputs and/or present game play to a player. Using FIG. 3 as an example, the different UI elements are shown as game play UI elements 306A-306N and bonus game play UI elements 310A-310N.

The game play UI 304 represents a UI that a player typically interfaces with for a base game. During a game instance of a base game, the game play UI elements 306A-306N (e.g., GUI elements depicting one or more virtual reels) are shown and/or made available to a user. In a subsequent game instance, the UI system 302 could transition out of the base game to one or more bonus games. The bonus game play UI 308 represents a UI that utilizes bonus game play UI elements 310A-310N for a player to interact with and/or view during a bonus game. In one or more implementations, at least some of the game play UI element 306A-306N are similar to the bonus game play UI elements 310A-310N. In other implementations, the game play UI element 306A-306N can differ from the bonus game play UI elements 310A-310N.

FIG. 3 also illustrates that UI system 302 could include a multiplayer UI 312 purposed for game play that differs or is separate from the typical base game. For example, multiplayer UI 312 could be set up to receive player inputs and/or presents game play information relating to a tournament mode. When a gaming device transitions from a primary game mode that presents the base game to a tournament mode, a single gaming device is linked and synchronized to other gaming devices to generate a tournament outcome. For example, multiple RNG engines 316 corresponding to each gaming device could be collectively linked to determine a tournament outcome. To enhance a player's gaming experience, tournament mode can modify and synchronize sound, music, reel spin speed, and/or other operations of the gaming devices according to the tournament game play. After tournament game play ends, operators can switch back the gaming device from tournament mode to a primary game mode to present the base game. Although FIG. 3 does not explicitly depict that multiplayer UI 312 includes UI elements, multiplayer UI 312 could also include one or more multiplayer UI elements.

Based on the player inputs, the UI system 302 could generate RNG calls to a game processing backend system 314. As an example, the UI system 302 could use one or more application programming interfaces (APIs) to generate the RNG calls. To process the RNG calls, the RNG engine 316 could utilize gaming RNG 318 and/or non-gaming RNGs 319A-319N. Gaming RNG 318 could corresponds to RNG 212 or hardware RNG 244 shown in FIG. 2A. As previously discussed with reference to FIG. 2A, gaming RNG 318 often performs specialized and non-generic operations that comply with regulatory and/or game requirements. For example, because of regulation requirements, gaming RNG 318 could correspond to RNG 212 by being a cryptographic RNG or pseudorandom number generator (PRNG) (e.g., Fortuna PRNG) that securely produces random numbers for one or more game features. To securely generate random numbers, gaming RNG 318 could collect random data from various sources of entropy, such as from an operating system (OS) and/or a hardware RNG (e.g., hardware RNG 244 shown in FIG. 2A). Alternatively, non-gaming RNGs 319A-319N may not be cryptographically secure and/or be computationally less expensive. Non-gaming RNGs 319A-319N can, thus, be used to generate outcomes for non-gaming purposes. As an example, non-gaming RNGs 319A-319N can generate random numbers for generating random messages that appear on the gaming device.

The RNG conversion engine 320 processes each RNG outcome from RNG engine 316 and converts the RNG outcome to a UI outcome that is feedback to the UI system 302. With reference to FIG. 2A, RNG conversion engine 320 corresponds to RNG conversion engine 210 used for game play. As previously described, RNG conversion engine 320 translates the RNG outcome from the RNG 212 to a game outcome presented to a player. RNG conversion engine 320 utilizes one or more lookup tables 322A-322N to regulate a prize payout amount for each RNG outcome and how often the gaming device pays out the derived prize payout amounts. In one example, the RNG conversion engine 320 could utilize one lookup table to map the RNG outcome to a game outcome displayed to a player and a second lookup table as a pay table for determining the prize payout amount for each game outcome. In this example, the mapping between the RNG outcome and the game outcome controls the frequency in hitting certain prize payout amounts. Different lookup tables could be utilized depending on the different game modes, for example, a base game versus a bonus game.

After generating the UI outcome, the game processing backend system 314 sends the UI outcome to the UI system 302. Examples of UI outcomes are symbols to display on a video reel or reel stops for a mechanical reel. In one example, if the UI outcome is for a base game, the UI system 302 updates one or more game play UI elements 306A-306N, such as symbols, for the game play UI 304. In another example, if the UI outcome is for a bonus game, the UI system could update one or more bonus game play UI elements 310A-310N (e.g., symbols) for the bonus game play UI 308. In response to updating the appropriate UI, the player may subsequently provide additional player inputs to initiate a subsequent game instance that progresses through the game processing pipeline.

Figure 4:
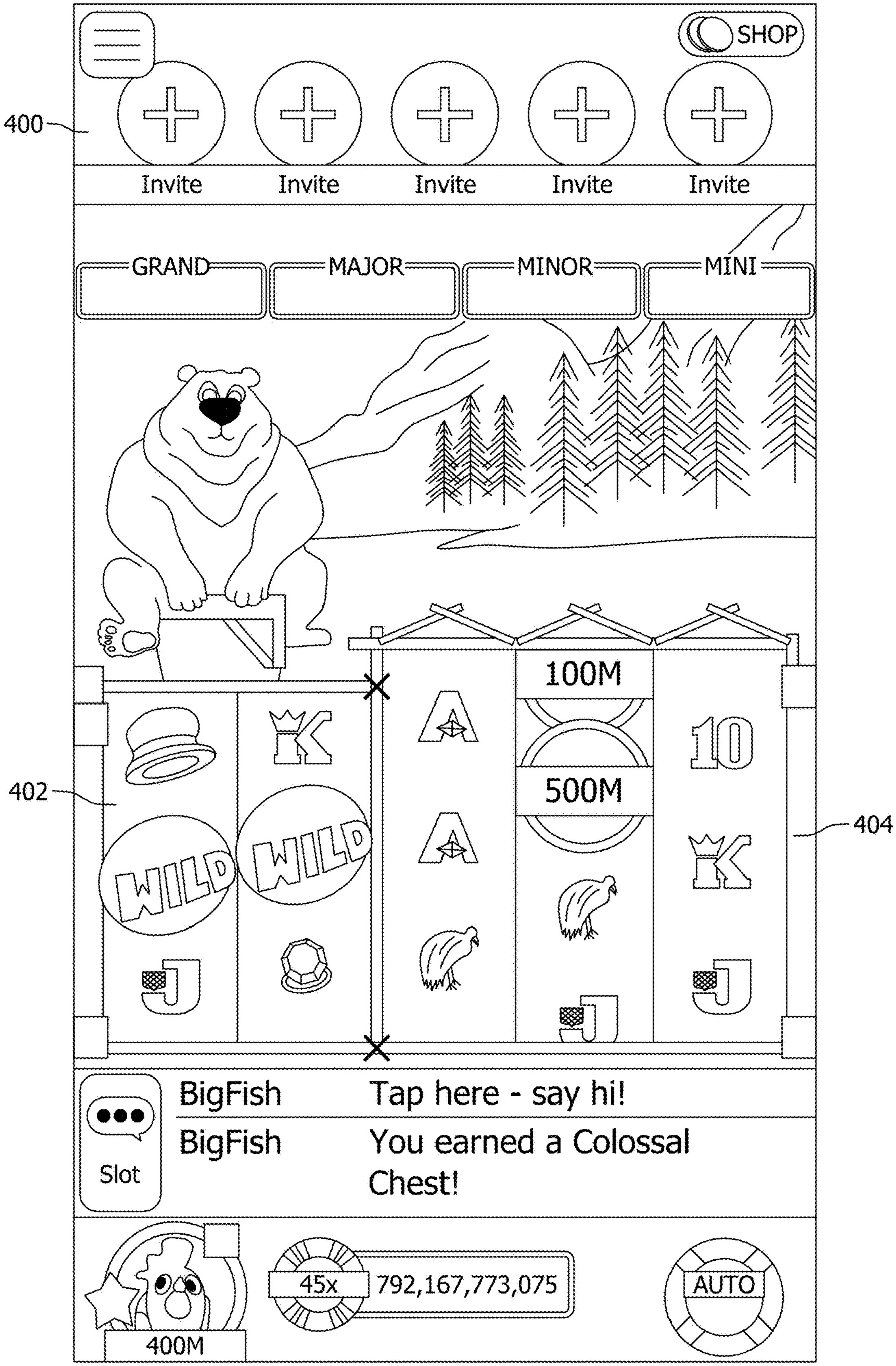
FIG. 4 is an illustrative game interface display such as may be presented on computer screen, phone display, or gaming device display, such as the display area of FIG. 1.

FIG. 4 is an illustrative game interface display 400 such as may be presented on computer screen, phone display, or EGM display. On embodiment of the display 400 may be similar to the display area 118 of FIG. 1. The display 400 may include reels 402, 404 in a base or other game before it transitions to a feature game with a mega reel, as described herein. As shown, the display 400 includes five reels 402, 404 with various symbols displayed on them. The reels 402, 404 are independently spun and stopped to show a set of symbols within the display 400, which may be used to determine an outcome to the game.

Figure 5:
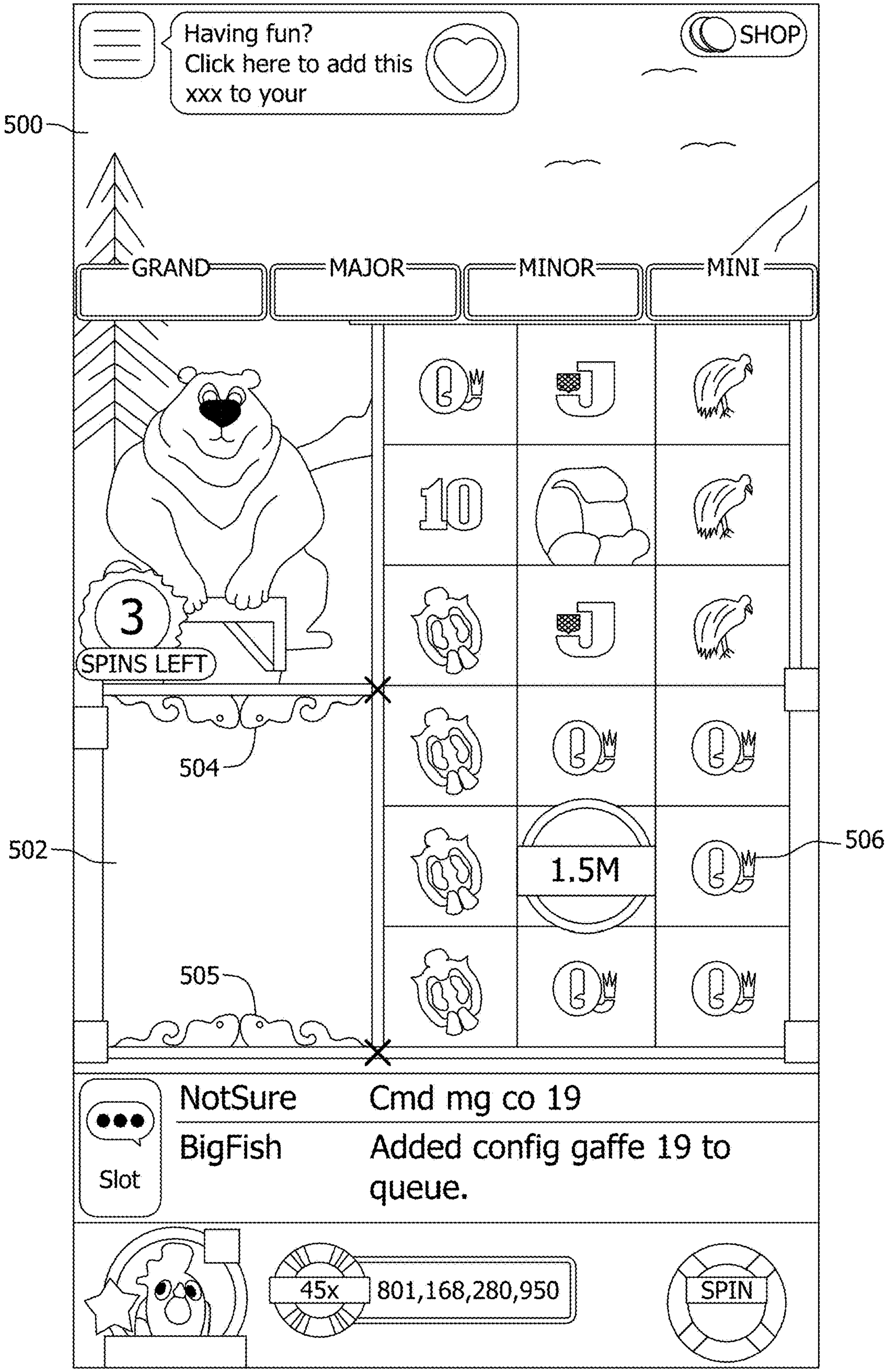
FIG. 5 show an illustrative display that includes a dedicated mega reel that includes mega symbols that are only partially displayed because the spin of the mega reel has resulted in a miss.

FIG. 5 show an illustrative display 500 that includes a dedicated mega reel 502 that includes mega symbols 504, 505. In the embodiment to FIG. 5, each mega symbols 504, 505 is only partially displayed, as the spin of the mega reel 502 has resulted in a miss. The mega reel 502 may randomly spin beside an array of hold and spin game reels 506 to enhance potential game payouts. For instance, when the mega reel 502 lands on a mega symbol 504, 505, the potential payout of the hold and spin game may be modified according to an underlying function of the mega symbol. Conversely, a miss on the mega reel 502, as shown, may result in the unaffected operation of the hold and spin game. The hold and spin reels include dividers around each symbol to designate the hold and spin operation.

Figure 6:
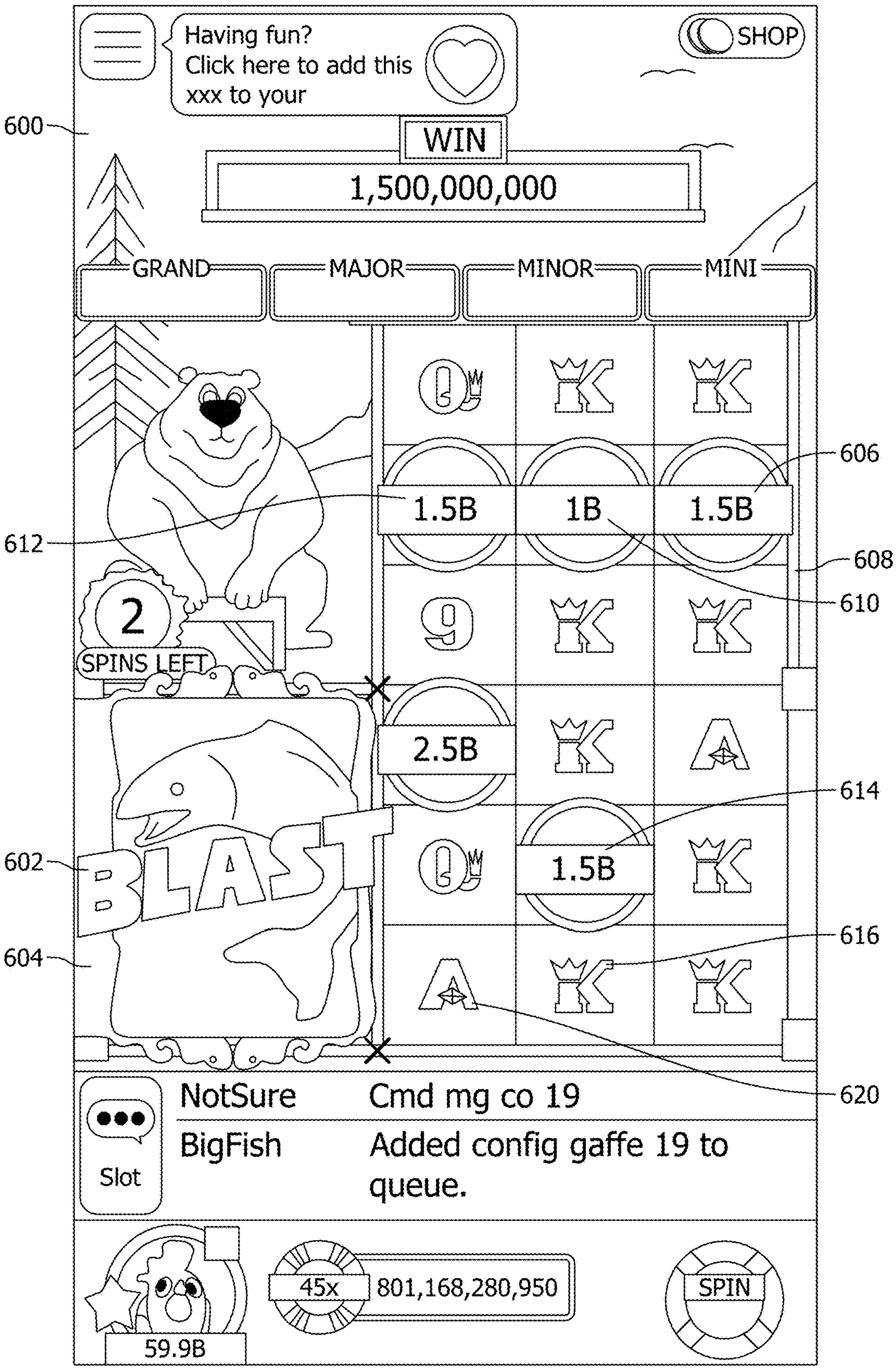
FIG. 6 shows another illustrative display that includes a mega reel that includes at least one mega symbol including a blast mega symbol that may initiate operations that instantly payout all of the present values of the COR symbols currently being displayed on the hold and spin reels.

FIG. 6 show an illustrative display 600 that includes a mega reel 602 that includes at least one blast mega symbol 604. In the implementation, the size of the mega symbol 604 and the mega reel 602 may be larger than that of a conventional symbol 606 and associated reel 608. In terms of the display 400 of FIG. 4, it may appear to a player that two hold and spin reels 402 appear to have merged during game operation, seemingly transitioning into a single mega reel 602 in FIG. 6 that is twice the width of one of the former, merged hold and spin reels. Put another way, the mega reel 602 may occupy a space equivalent to that formerly occupied by two merged reels. Initializing of the mega reel 602 and associated meg symbol(s) 604 may be presented within the hold and spin interface, while leaving multiple hold and spin reels intact 608.

In the embodiment of FIG. 6, the mega symbol 604 comprises a blast mega symbol. That is, a spin operation has resulted in the mega reel 602 landing on a blast mega symbol 604. A function underlying the blast mega symbol 604 may initiate operations similar to a spot prize and instantly payout all of the present values of the COR symbols 606, 610, 612, 614, and 616 currently being displayed on the hold and spin reels 608, 618, 620. As such, a player may be award twice-once up front with the blast feature, and then, again, at the end of the feature game (e.g., again with the present value of the COR symbols 606, 610, 612, 614, and 616, in addition to any previously or subsequently earned awards).

The mega reel 602 may include a single reel that spins independently and either displays a mega symbol 604 or a blank display. As explained herein, the mega symbol 602 may be weighted depending on how many COR symbols 606, 610, 612, 614, and 616 are present in the hold and spin reel interface. For example, certain types of mega symbols may become rarer in proportion to an increasing number of hold COR symbols. Each mega symbol on the randomly spinning mega reel 602 may be associated with a function that may modify awards of the hold and spin operation. As such, an embodiment of the system may include an RNG for the COR symbols 604 and another RNG for the mega symbols 604.

Figure 7:
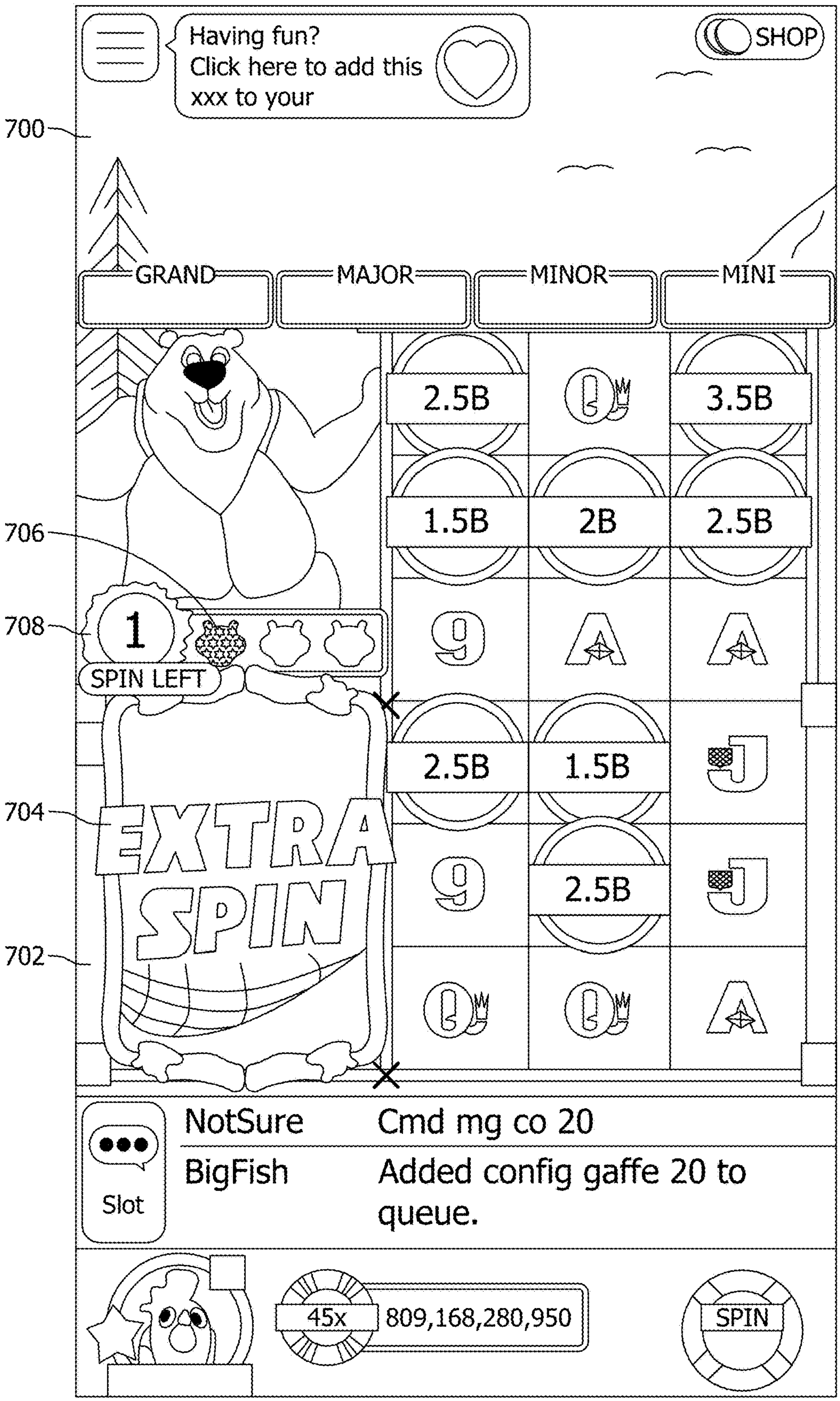
FIG. 7 shows another illustrative display that includes a mega reel that includes at least one mega symbol including an extra spin mega symbol associated with a function that generates at least one extra spin operation.

FIG. 7 shows another illustrative display 700 that includes a mega reel 702 that includes at least one mega symbol 704. More particularly, the mega symbol comprises an extra spin mega symbol 704. As described herein, the extra spin mega symbol 704 may be associated with an operation that generates at least one extra spin operation. The mega reel landing on the extra spin mega symbol 704 may result in the game adding one or more extra spins that may be played after the initial spins of the feature game are exhausted. For example, the extra spin mega symbol of an embodiment may provide up to three spins to play at the end of the feature game. As described herein, an additional meter 706 (e.g., positioned next to a regular hold and spin counter 708) may show the amount of available extra spins. The extra spins may afford the player a chance to land additional COR symbols and mega symbols.

Figure 8:
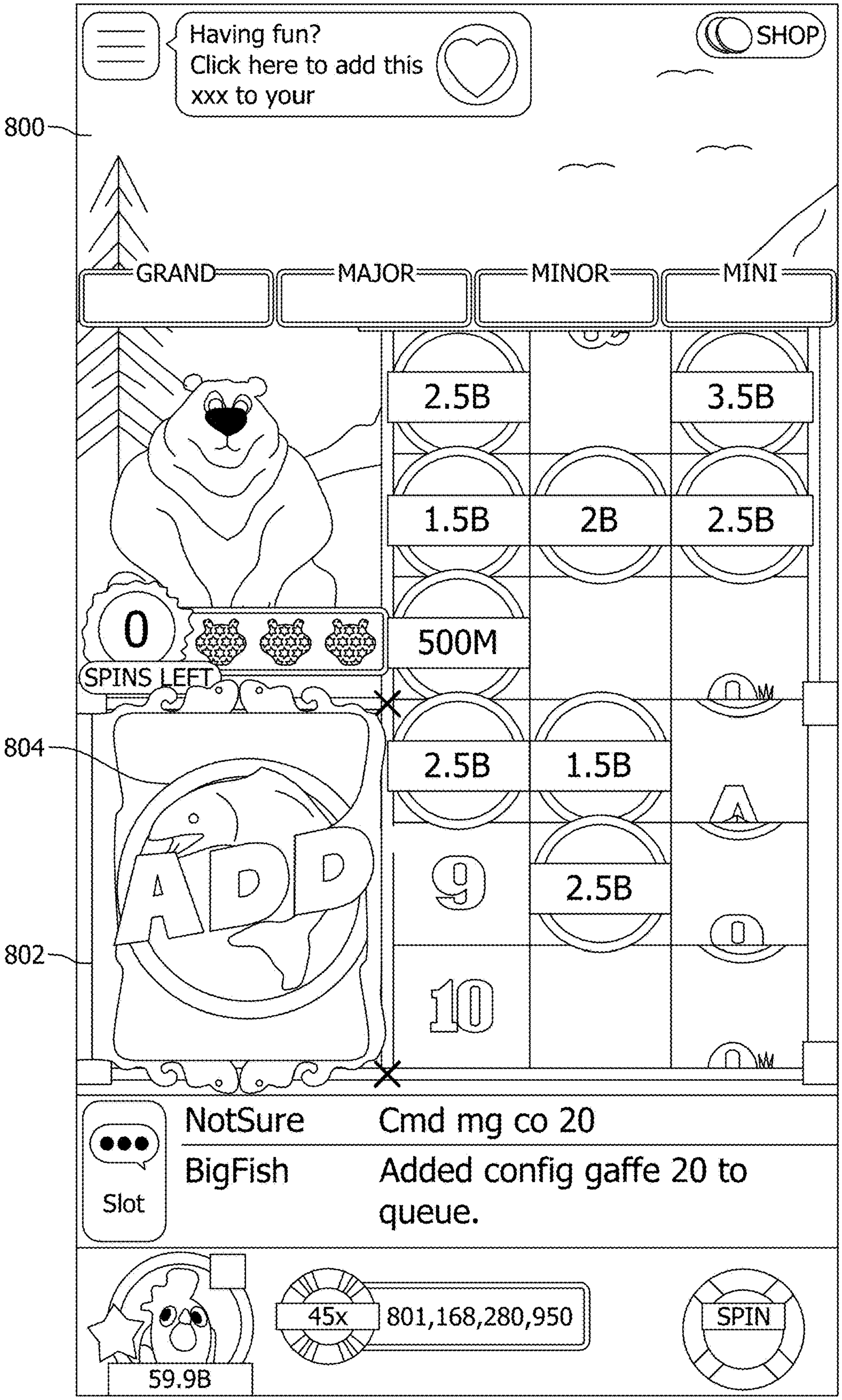
FIG. 8 shows another illustrative display that includes a mega reel that includes at least one mega symbol including an add mega symbol that may result in the random distribution of one or more COR symbols in a hold and spin space(s) in which there currently is no COR symbol, and/or an increase in the value of COR symbols that are already present.

FIG. 8 shows another illustrative display 800 that includes a mega reel 802 that includes at least one mega symbol 804. More particularly, the mega symbol comprises an add mega symbol 804. The mega reel landing on the add mega symbol 804 may result in the random distribution of one or more COR symbols in hold and spin space(s) in which there currently is no COR symbol. Should the distribution instead be designated for a hold and spin spot that is already populated with a COR symbol, then the operation may upgrade the award value of the COR symbol. For instance, a value of an existing COR symbol may be upgraded from 1.5 billion credits to 3.5 billion credits. To this end, the system may pull credit values from a new COR table in instances where a new COR symbol is added and may access another table to access an increased value where a COR symbol is already present.

Figure 9:
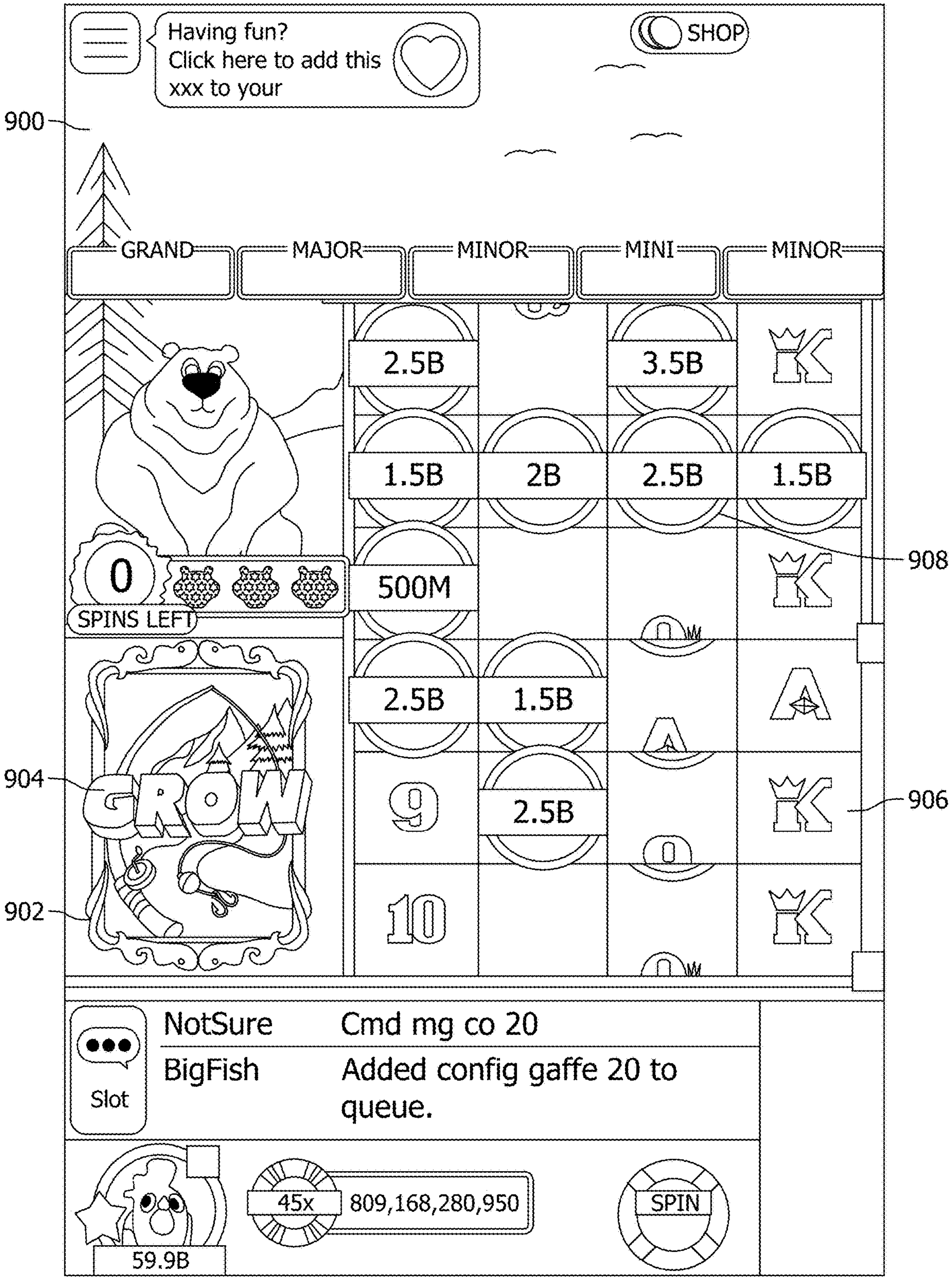
FIG. 9 shows another example of a game display that includes a mega symbol associated with a function including a grow operation that may result in the game adding one or more reels to an array of hold and spin reels.

FIG. 9 shows another example of a game display 900 that includes a mega symbol 902 associated with a computing algorithm including a grow operation. A mega reel 904 landing on the grow mega symbol 902 may result in the game adding one or more reels 906 to an array of hold and spin reels 908. For example, the new reel 906 may be added to a rightmost reel of the array of reels 908. The additional reel 906 may provide an increased chance to land additional COR symbols and mega symbols.

Figure 10:
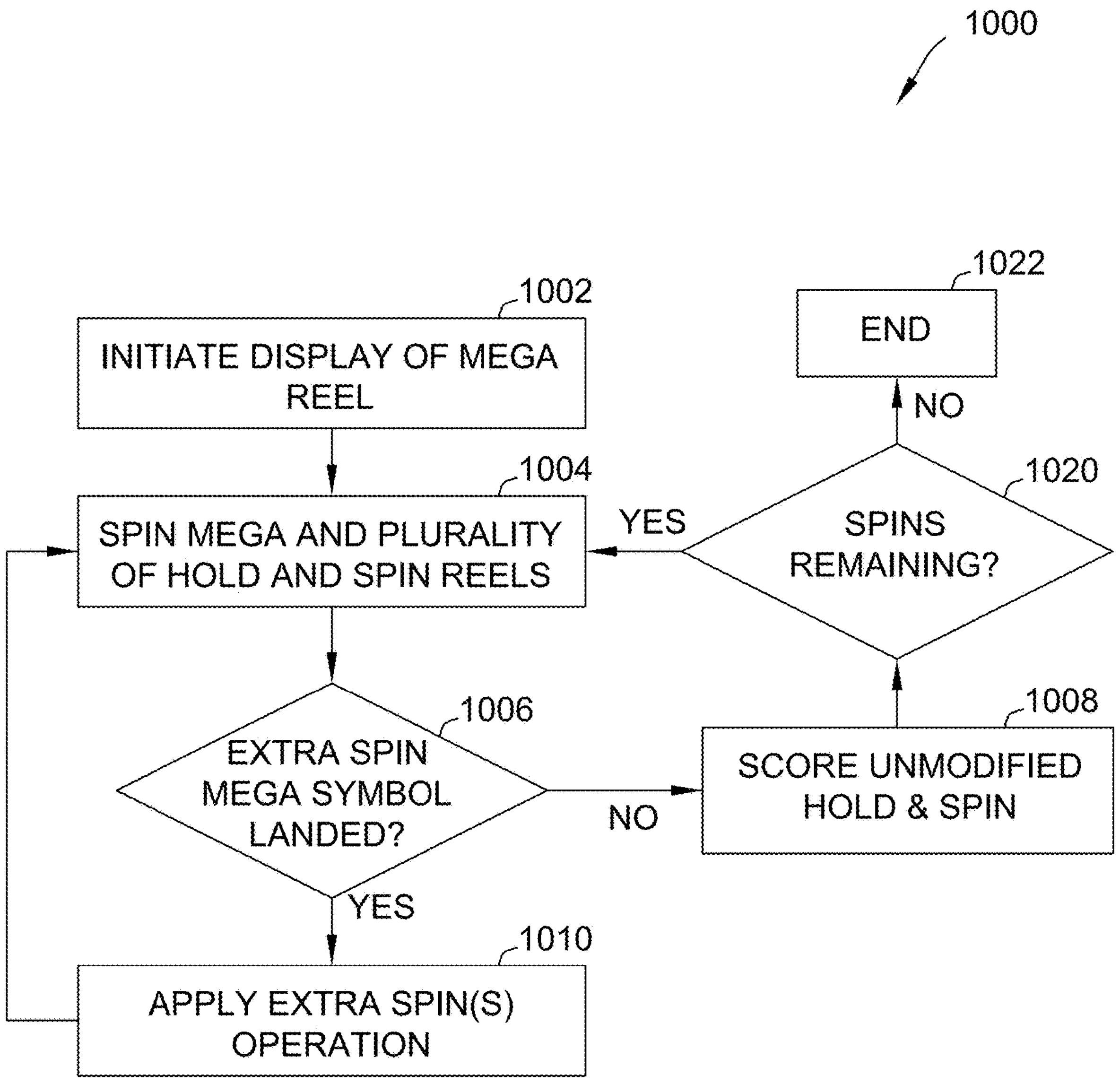
FIG. 10 is a flowchart of an example embodiment of a method of managing an electronic game that includes performing an extra spin function mega reel operation, such as in shown in FIG. 7.

FIG. 10 is a flowchart of an example embodiment of a method 1000 of managing an electronic game that includes performing an extra spin function mega reel operation, such as is shown in FIG. 7. As explained herein, the extra spin mega reel may spin alongside a plurality of hold and spin reels.

Turning more particularly to the flow diagram, the method 1000 at block 1002 may include initiating display of a mega reel with mega symbols, such as is shown in FIG. 5. The mega reel and the hold and spin reels may be spun at block 1004. The spinning of each may be weighted and random.

At block 1006, the method 1000 may include determining if a mega symbol on the mega reel has landed as a result of the spin at 1004. Where a mega symbol has not been detected at block 1006, then the method 1000 may execute processes at block 1008 associated with normal hold and spin operations. Such a scenario is shown in the display of FIG. 5.

Where an extra spin mega symbol is alternatively detected at block 1006, then the method 1000 may apply the underlying operation associated with the extra spin operation. More particularly, the mega reel landing on the extra spin mega symbol 1010 may initiate an operation that generates at least one extra spin operation. The mega reel landing on the extra spin mega symbol may result in the game adding one or more extra spins that may be played after the initial spins of the feature game are exhausted. For example, the extra spin mega symbol of an example embodiment may provide up to three spins to play at the end of the feature game. As described herein, an additional meter may show the amount of available extra spins. The extra spins may afford the player a chance to land additional COR symbols and mega symbols.

Figure 11:
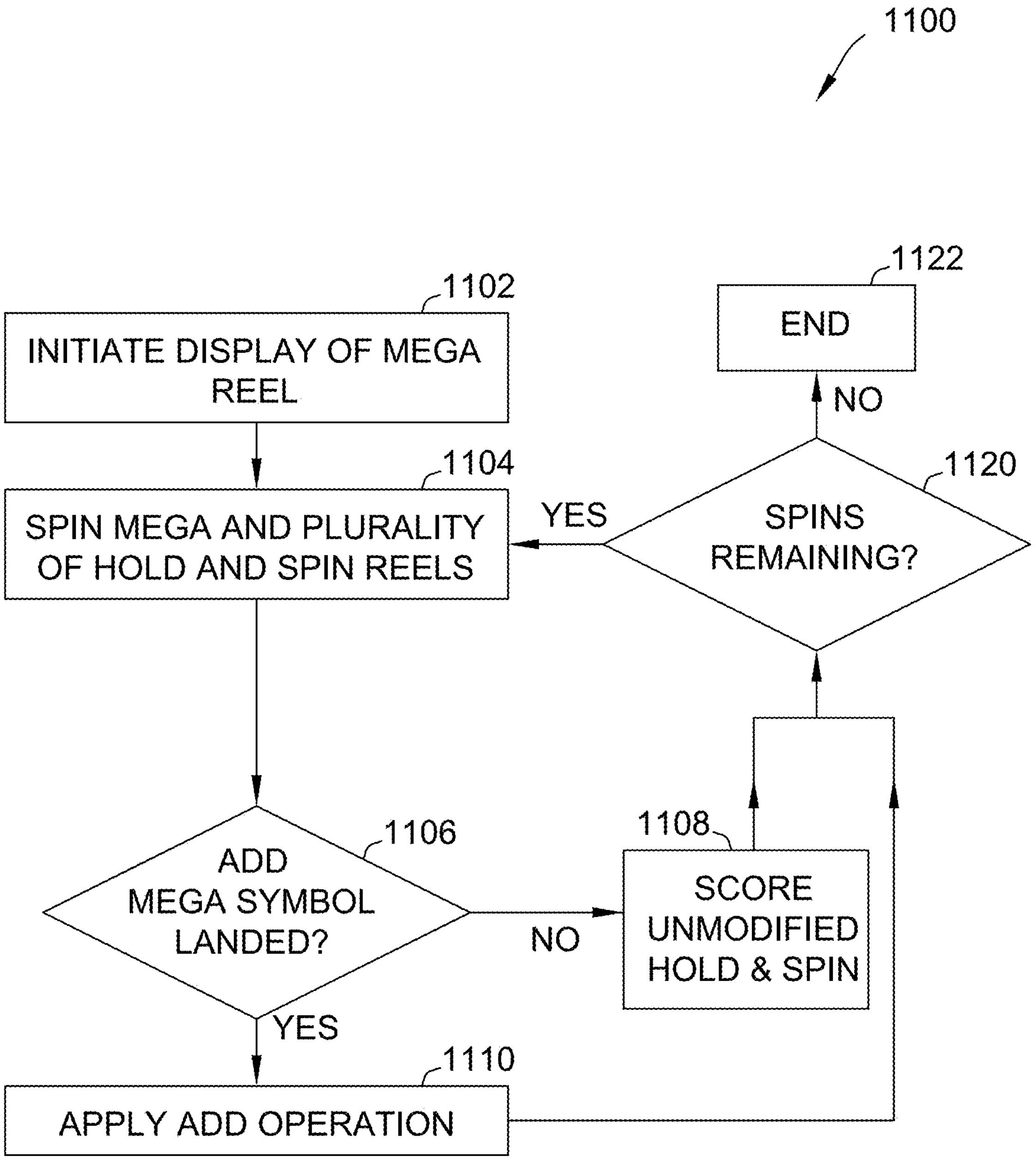
FIG. 11 is a flowchart of an example embodiment of a method of managing an electronic game that includes performing an add function mega reel operation, such as in shown in FIG. 8.

FIG. 11 is a flowchart of an example embodiment of a method 1100 of managing an electronic game that includes performing an add function mega reel operation, such as in shown in FIG. 8. As explained herein, the add mega reel may spin alongside a plurality of hold and spin reels.

Turning more particularly to the flow diagram, the method 1100 at block 1102 may include initiating display of a mega reel with mega symbols, such is shown in FIG. 5. The mega reel and the hold and spin reels may be spun at block 1104. The spinning of each may be weighted and random.

At block 1106, the method 1100 may include determining if an add mega symbol on the mega reel has landed as a result of the spin at 1104. Where an add mega symbol has not been detected at block 1106, then the method 1100 may execute processes at block 1108 associated with normal hold and spin operations. Such a scenario is shown in the display of FIG. 5.

Where an add mega symbol is alternatively detected at block 1106, then the method 1100 may apply the underlying operation associated with the add mega symbol, such as is shown in FIG. 8. The mega reel landing on the add mega symbol may result in the random distribution of one or more COR symbols in hold and spin space(s) in which there currently is no COR symbol. Should the distribution instead be designated for a hold and spin spot that is already populated with a COR symbol, then the operation may upgrade the award value of the COR symbol. For instance, a value of an existing COR symbol may be upgraded from 1.5 billion credits to 3.5 billion credits. To this end, the system may pull credit values from a new COR table in instances where a new COR symbol is added and may access another table to access an increased value where a COR symbol is already present.

Figure 12:
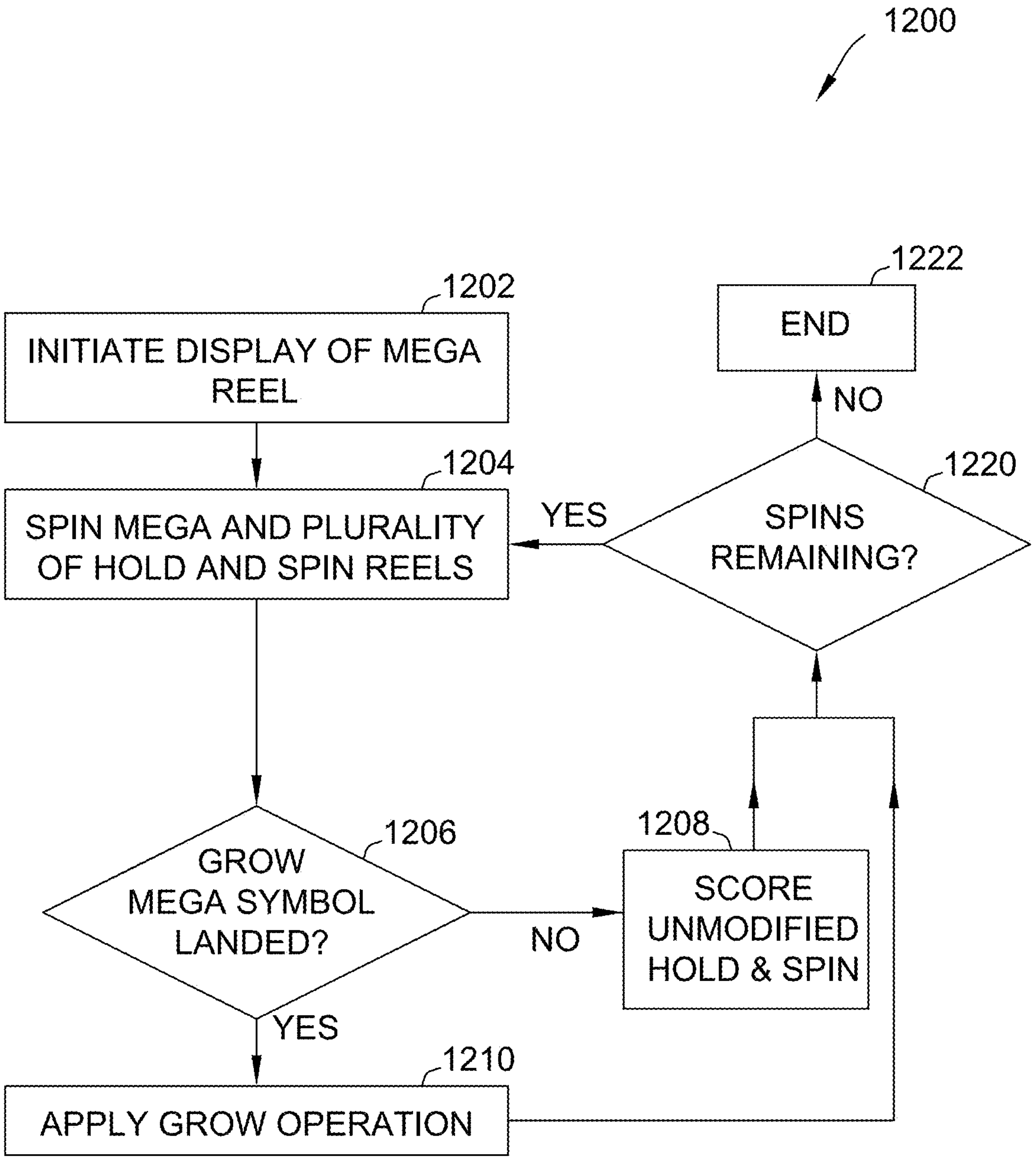
FIG. 12 is a flowchart of an example embodiment of a method of managing an electronic game that includes performing a grow function mega reel operation, such as in shown in FIG. 9.

FIG. 12 is a flowchart of an example embodiment of a method 1200 of managing an electronic game that includes performing a grow function mega reel operation, such as is shown in FIG. 9. As explained herein, the extra spin mega reel may spin alongside a plurality of hold and spin reels.

Turning more particularly to the flow diagram, the method 1200 at block 1202 may include initiating display of a mega reel with mega symbols, such as is shown in FIG. 5. The mega reel and the hold and spin reels may be spun at block 1204. The spinning of each may be weighted and random.

At block 1206, the method 1200 may include determining if a grow mega symbol on the mega reel has landed as a result of the spin at 1204. Where a grow mega symbol has not been detected at block 1206, then the method 1200 may execute processes at block 1208 associated with normal hold and spin operations. Such a scenario is shown in the display of FIG. 5.

Where the grow mega symbol is alternatively detected at block 1206, then the method 1200 may apply the underlying operation associated with the grow mega symbol, such as is shown in FIG. 9. The mega reel landing on the grow mega symbol may result in the game adding one or more reels to an array of hold and spin reels. For example, the new reel may be added to a rightmost reel of the array of reels. The additional reel may provide an increased chance to land additional COR symbols and mega symbols.

Figure 13:
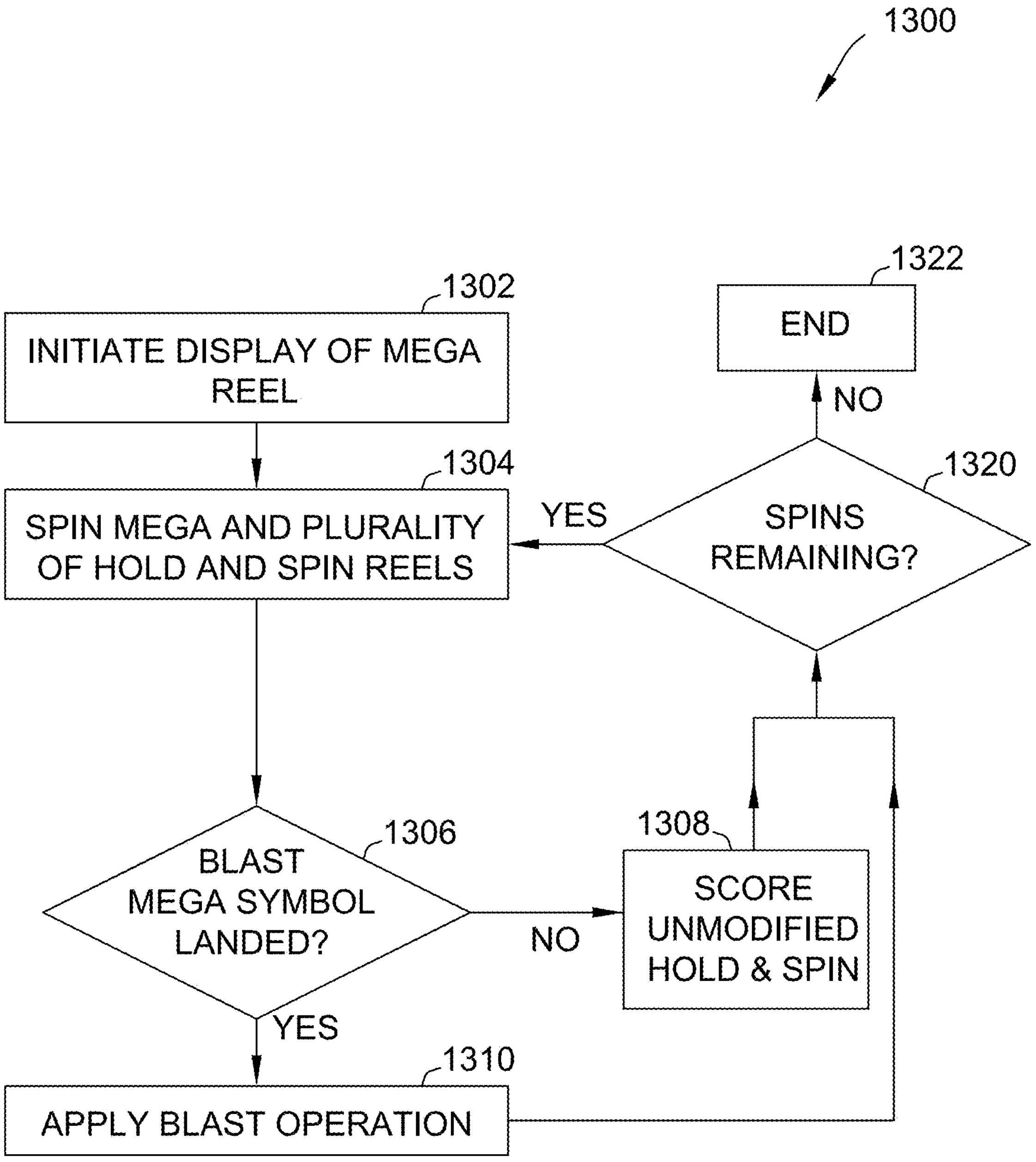
FIG. 13 is a flowchart of an example embodiment of a method of managing an electronic game that includes performing a blast function mega reel operation, such as in shown in FIG. 6.

FIG. 13 is a flowchart of an example embodiment of a method 1300 of managing an electronic game that includes performing a blast function mega reel operation, such as in shown in FIG. 6. As explained herein, the add mega reel may spin alongside a plurality of hold and spin reels.

Turning more particularly to the flow diagram, the method 1300 at block 1302 may include initiating display of a mega reel with mega symbols, such as is shown in FIG. 5. The mega reel and the hold and spin reels may be spun at block 1304. The spinning of each may be weighted and random.

At block 1306, the method 1300 may include determining if an add mega symbol on the mega reel has landed as a result of the spin at 1304. Where a blast mega symbol has not been detected at block 1306, then the method 1300 may execute processes at block 1308 associated with normal hold and spin operations. Such a scenario is shown in the display of FIG. 5.

Where a blast mega symbol is alternatively detected at block 1306, then the method 1300 may apply the underlying operation associated with the blast mega symbol, such as is shown in FIG. 6. The mega reel landing on the blast mega symbol may result in operations similar to a spot prize and instantly payout all of the present values of the COR symbols currently being displayed on the hold and spin reels. As such, a player may be award twice-once up front with the blast feature, and then, again, at the end of the feature game.

While the disclosure has been described with respect to the figures, it will be appreciated that many modifications and changes may be made by those skilled in the art without departing from the spirit of the disclosure. Any variation and derivation from the above description and figures are included in the scope of the present disclosure as defined by the claims.

What is claimed is:

1. A gaming device comprising:

at least one memory with instructions stored thereon; and at least one processor in communication with the at least one memory, wherein the instructions, when executed by the at least one processor, cause the at least one processor to:

cause a display of a plurality of reels, each reel including a plurality of symbols for display therein including a plurality of value symbols;

cause a display of a mega reel that includes at least one mega symbol, wherein the at least one mega symbol is associated with an operation applied to the symbols displayed on the reels;

using an output from a random number generator and a lookup within a lookup table, determine a mega symbol to display on the mega reel; and execute the operation associated with the mega symbol to affect the symbols displayed on the reels and an award provided therefrom, wherein the operation is executed by at least causing one or more bonus reels to be added to the plurality of reels.

2. The gaming device of claim 1, wherein the at least one processor is further programmed to execute the operation further by outputting a total credit value associated with all of the symbols displayed on the reels.

3. The gaming device of claim 2, wherein the at least one processor is further programmed to output the total credit value, again, at a conclusion of a game.

4. The gaming device of claim 1, wherein the at least one processor is further programmed to execute the operation further by causing one or more new value symbols to be displayed on the plurality of reels.

5. The gaming device of claim 4, wherein causing the one or more new value symbols to be displayed on the plurality of reels further comprises the at least one processor further programmed to add the one or more new value symbols at one or more positions on the plurality of reels where there had been a value symbol of the plurality of value symbols.

6. The gaming device of claim 1, wherein the at least one processor is further programmed to execute the operation further by increasing a value of at least one of the plurality of value symbols.

7. The gaming device of claim 1, wherein the at least one processor is further programmed to execute the operation further by increasing a value of at least one of the plurality of value symbols and causing one or more new value symbols to be displayed on the plurality of reels.

8. The gaming device of claim 1, wherein the at least one processor is further programmed to execute the operation further by awarding at least one bonus spin operation.

9. The gaming device of claim 1, wherein the mega reel has a height and a width dimension, and wherein one of the dimensions of the mega reel is greater than one of the dimensions of one of the plurality of reels.

10. The gaming device of claim 1, wherein the processor is further programmed to cause the mega reel to be displayed in an area formerly occupied by two or more of the plurality of reels.

11. A computer-implemented method of providing a game for display on a computing device, the method comprising:

causing a display of a plurality of reels, each reel including a plurality of symbols for display therein including a plurality of value symbols;

causing a display of a mega reel that includes at least one mega symbol, wherein the at least one mega symbol is associated with an operation applied to the symbols displayed on the reels;

using an output from a random number generator and a lookup within a lookup table, determine a mega symbol to display on the mega reel; and executing the operation associated with the mega symbol to affect the symbols displayed on the reels and an award provided therefrom, wherein the operation is executed by at least causing one or more bonus reels to be added to the plurality of reels.

12. The computer-implemented method of claim 11, wherein executing the operation further comprises outputting a total credit value associated with all of the symbols displayed on the reels.

13. The computer-implemented method of claim 12, further comprising outputting the total credit value, again, at a conclusion of a game.

14. The computer-implemented method of claim 11, wherein executing the operation further comprises causing one or more new value symbols to be displayed on the plurality of reels.

15. The computer-implemented method of claim 11, wherein executing the operation further comprises increasing a value of at least one of the plurality of value symbols.

16. The computer-implemented method of claim 11, wherein executing the operation further comprises increasing a value of at least one of the plurality of value symbols and causing one or more new value symbols to be added to the plurality of reels.

17. The computer-implemented method of claim 11, wherein executing the operation further comprises awarding at least one bonus spin operation.

18. A non-transitory computer-readable storage medium that includes computer-executable instructions that when executed by at least one processor, cause the at least one processor to:

cause a display of a plurality of reels, each reel including a plurality of symbols for display therein including a plurality of value symbols;

cause a display of a mega reel that includes at least one mega symbol, wherein the at least one mega symbol is associated with an operation applied to the symbols displayed on the reels;

using an output from a random number generator and a lookup within a lookup table, determine a mega symbol to display on the mega reel; and execute the operation associated with the mega symbol to affect the symbols displayed on the reels and an award provided therefrom, wherein the operation is executed by at least causing one or more bonus reels to be added to the plurality of reels.

* * * * *